United States Patent
Dapino et al.

(10) Patent No.: US 11,697,172 B2
(45) Date of Patent: Jul. 11, 2023

(54) SYSTEMS AND METHODS FOR JOINING AND REPAIR USING ULTRASONIC ADDITIVE MANUFACTURING WITH A CONTOURED SONOTRODE

(71) Applicant: Ohio State Innovation Foundation, Columbus, OH (US)

(72) Inventors: Marcelo Dapino, Columbus, OH (US); Leon Headings, Columbus, OH (US); Mark Gingerich, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 17/013,128

(22) Filed: Sep. 4, 2020

(65) Prior Publication Data
US 2021/0069822 A1    Mar. 11, 2021

Related U.S. Application Data

(60) Provisional application No. 62/896,384, filed on Sep. 5, 2019.

(51) Int. Cl.
| | |
|---|---|
| *B23K 20/10* | (2006.01) |
| *B33Y 30/00* | (2015.01) |
| *B23P 6/00* | (2006.01) |
| *B33Y 10/00* | (2015.01) |

(52) U.S. Cl.
CPC .............. *B23K 20/106* (2013.01); *B23P 6/00* (2013.01); *B33Y 10/00* (2014.12); *B33Y 30/00* (2014.12)

(58) Field of Classification Search
None
See application file for complete search history.

(56) References Cited

U.S. PATENT DOCUMENTS

| | | | | |
|---|---|---|---|---|
| 4,975,133 A | * | 12/1990 | Gochermann | H01L 31/188 156/580.2 |
| 5,730,832 A | * | 3/1998 | Sato | B29C 66/8322 156/499 |
| 5,947,364 A | * | 9/1999 | Tamura | B23K 20/106 156/580.2 |
| 6,247,628 B1 | * | 6/2001 | Sato | B23K 20/106 228/110.1 |
| 6,519,500 B1 | | 2/2003 | White | |
| 6,523,732 B1 | * | 2/2003 | Popoola | B23K 20/106 228/110.1 |
| 6,743,331 B2 | * | 6/2004 | Takahashi | B23K 20/106 156/580.2 |
| 6,877,648 B2 | * | 4/2005 | Higashiyama | H01L 21/67092 156/580.2 |
| 7,337,938 B2 | * | 3/2008 | Noro | B29C 66/1122 228/1.1 |

(Continued)

*Primary Examiner* — Devang R Patel
(74) *Attorney, Agent, or Firm* — Meunier Carlin & Curfman LLC

(57) ABSTRACT

An ultrasonic additive manufacturing system may include a base structure, a sonotrode configured to rotate about an axis of rotation, and one or more transducers configured to vibrate the sonotrode. The sonotrode may include a welding surface extending along a circumference of the sonotrode, and the welding surface may have a contoured profile. At least one of the sonotrode and the base structure may be configured to translate relative to the other of the sonotrode and the base structure.

12 Claims, 14 Drawing Sheets

(56) References Cited

U.S. PATENT DOCUMENTS

| | | | | |
|---|---|---|---|---|
| 7,484,650 B2* | 2/2009 | Szucher | ................ | B26D 7/086 |
| | | | | 156/73.6 |
| 8,082,966 B2* | 12/2011 | Short | ................ | B06B 3/00 |
| | | | | 156/580.2 |
| 8,800,846 B2* | 8/2014 | Nikkhoo | ................ | B23K 20/004 |
| | | | | 228/180.5 |
| 9,346,120 B1* | 5/2016 | Graff | ................ | B06B 3/00 |
| 10,071,439 B1 | 9/2018 | Misak et al. | | |
| 10,265,913 B2* | 4/2019 | Rousseau | ................ | B29C 66/863 |
| 2010/0040903 A1* | 2/2010 | Kalt | ................ | B23K 20/002 |
| | | | | 228/110.1 |
| 2013/0075454 A1* | 3/2013 | Buettiker | ................ | B06B 3/00 |
| | | | | 228/110.1 |
| 2017/0282290 A1* | 10/2017 | Nakamoto | ................ | H02N 2/00 |
| 2018/0219345 A1* | 8/2018 | Böhm | ................ | H01R 4/187 |
| 2020/0324362 A1* | 10/2020 | Vogli | ................ | B23K 26/352 |

\* cited by examiner

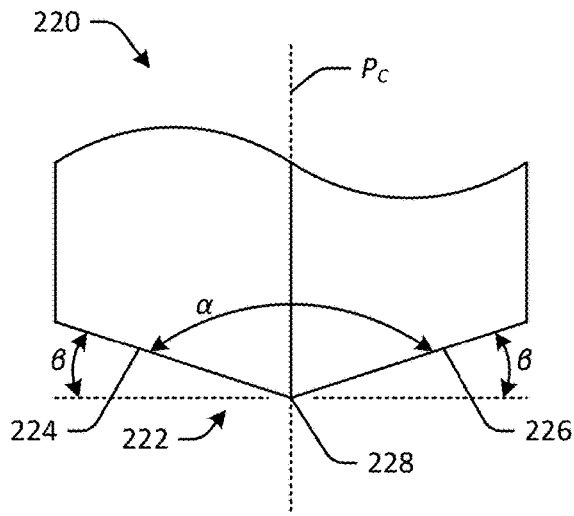
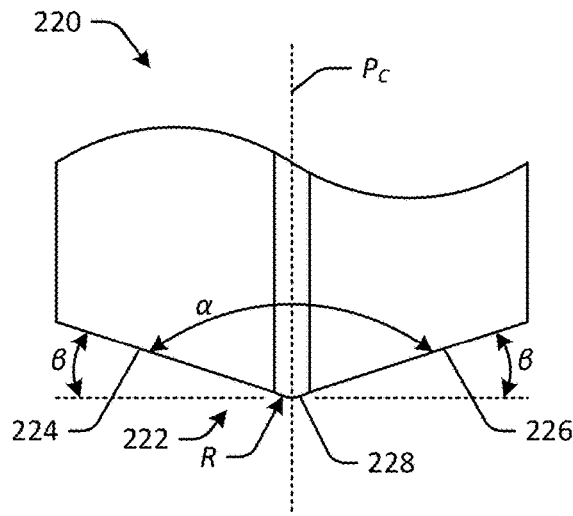
FIG. 2D          FIG. 2E
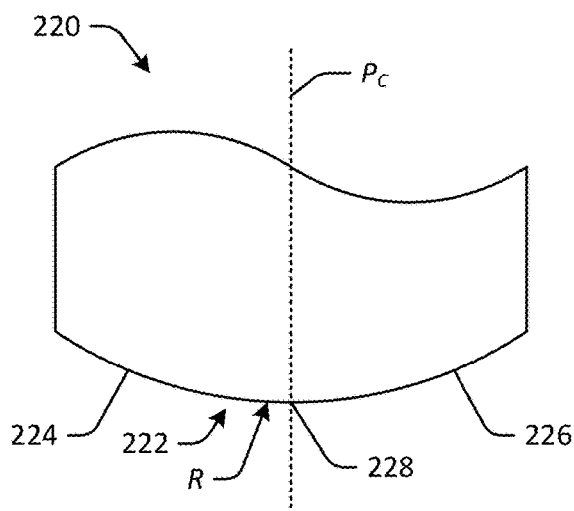
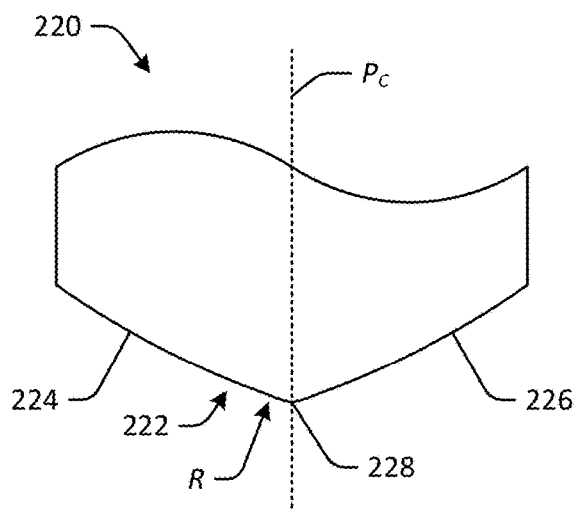
FIG. 2F          FIG. 2G

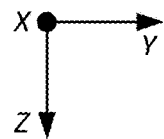
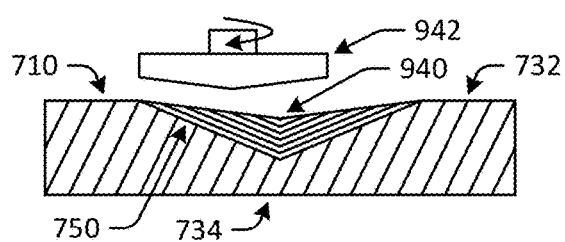
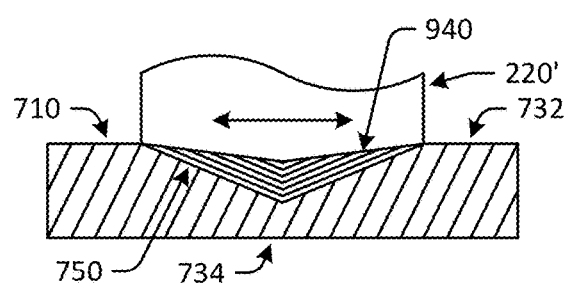
FIG. 9A
FIG. 9B
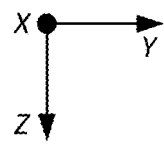
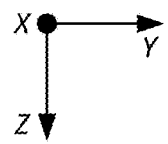
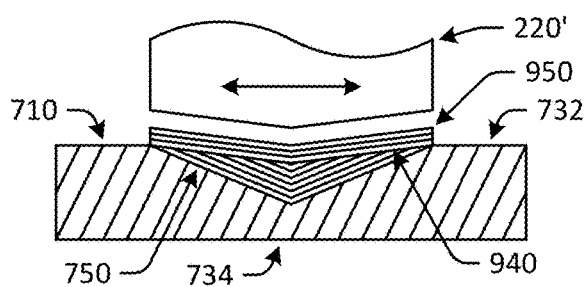
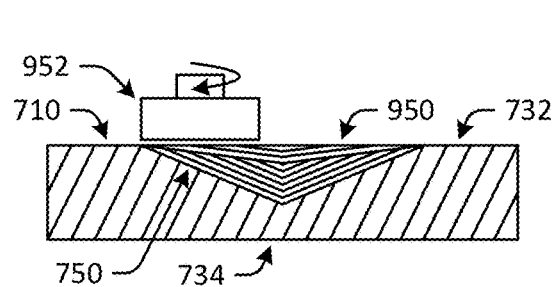
FIG. 9C
FIG. 9D

SYSTEMS AND METHODS FOR JOINING AND REPAIR USING ULTRASONIC ADDITIVE MANUFACTURING WITH A CONTOURED SONOTRODE

CROSS-REFERENCE TO RELATED APPLICATIONS

This application claims priority to and the benefit of U.S. Provisional Patent Application No. 62/896,384, filed on Sep. 5, 2019, the disclosure of which is expressly incorporated herein by reference in its entirety.

FIELD OF THE DISCLOSURE

The present disclosure relates generally to additive manufacturing and more particularly to systems and methods for joining and repair using ultrasonic additive manufacturing with a contoured sonotrode.

BACKGROUND OF THE DISCLOSURE

Additive manufacturing may be used in various applications to build three-dimensional objects by successively adding layer-upon-layer of material. Ultrasonic additive manufacturing (UAM) is one type of additive manufacturing, which is based on solid-state welding of metal foil feedstock using high-power ultrasonic vibrations. Conventional UAM systems generally may include a base support for supporting a metal base structure, a sonotrode for welding metal foils onto the metal base structure, and one or more transducers for vibrating the sonotrode. In operation, the sonotrode may roll over each layer of metal foil longitudinally (x-direction) to weld the metal foil to the metal base structure. While rolling, the sonotrode also may grip the metal foil and apply lateral (y-direction) displacements to provide a scrubbing action and plastic deformation between the metal foil and the metal base structure, creating intimate metal-to-metal contact that results in solid-state welding. Conventional sonotrodes typically may have a cylindrical shape, such that a welding surface extending along the circumference of the sonotrode has a flat profile. Due to the flat profile, the scrubbing motion provided by conventional sonotrodes generally may be unable to produce good welds for interfaces that are normal to the x-y plane. Accordingly, when using a cylindrical sonotrode to weld a conventional, flat, thin metal foil, the edges of the metal foil typically cannot be welded well to adjacent metal foils or base structure, leaving cracks or weak areas in the build. Such defects in the object formed by UAM may be undesirable or unacceptable in many applications.

A need therefore remains for improved ultrasonic additive manufacturing systems and methods that minimize the creation of cracks or areas of weakness in welding a metal foil to adjacent metal foils or metal base structure. It is with respect to these and other considerations that embodiments of the present disclosure are presented.

SUMMARY OF THE DISCLOSURE

The present disclosure provides ultrasonic additive manufacturing systems and related methods of using such systems for joining metal structures and repairing metal structures. In one aspect, an ultrasonic additive manufacturing system is provided. In one embodiment, an ultrasonic additive manufacturing system may include a base structure, a sonotrode configured to rotate about an axis of rotation, and one or more transducers configured to vibrate the sonotrode. The sonotrode may include a welding surface extending along a circumference of the sonotrode, and the welding surface may have a contoured profile. At least one of the sonotrode and the base structure may be configured to translate relative to the other of the sonotrode and the base structure.

In some embodiments, the contoured profile may include a V-shaped profile. In some embodiments, an included angle of the V-shaped profile may be between 60 degrees and 179 degrees. In some embodiments, the V-shaped profile may be defined by a first side portion and a second side portion of the welding surface, and the contoured profile also may include a curved profile defined by a central portion of the welding surface disposed between the first side portion and the second side portion of the welding surface. In some embodiments, the contoured profile may include a curved profile. In some embodiments, the curved profile may have a constant radius of curvature. In some embodiments, the curved profile may have a variable radius of curvature. In some embodiments, at least a portion of the contoured profile may be nonparallel to the axis of rotation of the sonotrode. In some embodiments, an entirety of the contoured profile may be nonparallel to the axis of rotation of the sonotrode. In some embodiments, the contoured profile may be symmetric about a central plane extending perpendicular to the axis of rotation of the sonotrode. In some embodiments, the welding surface may include a surface texture.

In another aspect, a sonotrode for ultrasonic additive manufacturing is provided. In one embodiment, a sonotrode may include a welding surface extending along a circumference of the sonotrode, and the welding surface may have a contoured profile.

In some embodiments, the contoured profile may include a V-shaped profile. In some embodiments, an included angle of the V-shaped profile may be between 60 degrees and 179 degrees. In some embodiments, the V-shaped profile may be defined by a first side portion and a second side portion of the welding surface, and the contoured profile also may include a curved profile defined by a central portion of the welding surface disposed between the first side portion and the second side portion of the welding surface. In some embodiments, the contoured profile may include a curved profile. In some embodiments, the curved profile may have a constant radius of curvature. In some embodiments, the curved profile may have a variable radius of curvature. In some embodiments, at least a portion of the contoured profile may be nonparallel to an axis of rotation of the sonotrode. In some embodiments, an entirety of the contoured profile may be nonparallel to an axis of rotation of the sonotrode. In some embodiments, the contoured profile may be symmetric about a central plane extending perpendicular to an axis of rotation of the sonotrode. In some embodiments, the welding surface may include a surface texture.

In still another aspect, a method for joining a first metal structure and a second metal structure using ultrasonic additive manufacturing is provided. In one embodiment, a method may include: positioning the first metal structure and the second metal structure adjacent one another; creating a first channel along a first side of an interface between the first metal structure and the second metal structure; and welding, via a sonotrode, one or more first metal foils at least partially within the first channel. The first channel may have a first contoured profile. The sonotrode may include a welding surface extending along a circumference of the sonotrode, and the welding surface may have a second contoured profile.

In some embodiments, the first contoured profile may be the same as the second contoured profile. In some embodiments, the first contoured profile may be different from the second contoured profile. In some embodiments, the first contoured profile and the second contoured profile each may include a V-shaped profile. In some embodiments, an included angle of the V-shaped profile of the second contoured profile may be between 60 degrees and 179 degrees. In some embodiments, the V-shaped profile of the second contoured profile may be defined by a first side portion and a second side portion of the welding surface, and the second contoured profile also may include a curved profile defined by a central portion of the welding surface disposed between the first side portion and the second side portion of the welding surface. In some embodiments, the first contoured profile and the second contoured profile each may include a curved profile. In some embodiments, at least one of the curved profile of the first contoured profile and the curved profile of the second contoured profile may have a constant radius of curvature. In some embodiments, at least one of the curved profile of the first contoured profile and the curved profile of the second contoured profile may have a variable radius of curvature. In some embodiments, at least a portion of the second contoured profile may be nonparallel to an axis of rotation of the sonotrode. In some embodiments, an entirety of the second contoured profile is nonparallel to an axis of rotation of the sonotrode. In some embodiments, the second contoured profile may be symmetric about a central plane extending perpendicular to an axis of rotation of the sonotrode.

In some embodiments, a first portion of the first channel may be defined by the first metal structure and a second portion of the first channel may be defined by the second metal structure. In some embodiments, the first channel may be defined entirely by one of the first metal structure and the second metal structure. In some embodiments, the first metal structure and the second metal structure may be formed of the same metal or alloy. In some embodiments, the first metal structure and the second metal structure may be formed of different metals or alloys. In some embodiments, the first metal structure, the second metal structure, and the one or more first metal foils may be formed of the same metal or alloy. In some embodiments, the first metal structure may be formed of a first metal or alloy, the second metal structure may be formed of a second metal or alloy different from the first metal or alloy, and the one or more first metal foils may be formed of a third metal or alloy different from each of the first metal or alloy and the second metal or alloy. In some embodiments, the one or more first metal foils may include a plurality of the first metal foils formed of the same metal or alloy. In some embodiments, the one or more first metal foils may include a plurality of the first metal foils formed of different metals or alloys.

In some embodiments, welding the one or more first metal foils at least partially within the first channel may include filling the first channel with the one or more first metal foils. In some embodiments, the method also may include removing excess material of the one or more first metal foils positioned outside of the first channel. In some embodiments, welding the one or more first metal foils at least partially within the first channel may include separately welding a plurality of the first metal foils at least partially within the first channel. In some embodiments, welding the one or more first metal foils at least partially within the first channel may include simultaneously welding a plurality of the first metal foils at least partially within the first channel. In some embodiments, the method also may include: removing material from the one or more first metal foils after welding the one or more first metal foils at least partially within the first channel; and welding, via the sonotrode, one or more additional first metal foils at least partially within the first channel after removing material from the one or more first metal foils. In some embodiments, the method also may include texturing, via the sonotrode, the first channel prior to welding the one or more first metal foils at least partially within the first channel. In some embodiments, the method also may include: creating a second channel along a second side of the interface between the first metal structure and the second metal structure, the second channel having a third contoured profile; and welding, via the sonotrode, one or more second metal foils at least partially within the second channel. In some embodiments, at least a portion of the second channel may be defined by the one or more first metal foils.

In another aspect, a method for repairing a defect in a metal structure using ultrasonic additive manufacturing is provided. In one embodiment, a method may include: creating a channel in the metal structure such that the defect is removed from the metal structure; and welding, via a sonotrode, one or more metal foils at least partially within the channel. The channel may have a first contoured profile. The sonotrode may include a welding surface extending along a circumference of the sonotrode, and the welding surface may have a second contoured profile.

In some embodiments, the first contoured profile may be the same as the second contoured profile. In some embodiments, the first contoured profile may be different from the second contoured profile. In some embodiments, the first contoured profile and the second contoured profile each may include a V-shaped profile. In some embodiments, an included angle of the V-shaped profile of the second contoured profile may be between 60 degrees and 179 degrees. In some embodiments, the V-shaped profile of the second contoured profile may be defined by a first side portion and a second side portion of the welding surface, and the second contoured profile also may include a curved profile defined by a central portion of the welding surface disposed between the first side portion and the second side portion of the welding surface. In some embodiments, the first contoured profile and the second contoured profile each may include a curved profile. In some embodiments, at least one of the curved profile of the first contoured profile and the curved profile of the second contoured profile may have a constant radius of curvature. In some embodiments, at least one of the curved profile of the first contoured profile and the curved profile of the second contoured profile may have a variable radius of curvature. In some embodiments, at least a portion of the second contoured profile may be nonparallel to an axis of rotation of the sonotrode. In some embodiments, an entirety of the second contoured profile may be nonparallel to an axis of rotation of the sonotrode. In some embodiments, the second contoured profile may be symmetric about a central plane extending perpendicular to an axis of rotation of the sonotrode.

In some embodiments, the metal structure and the one or more metal foils may be formed of the same metal or alloy. In some embodiments, the metal structure and the one or more metal foils may be formed of different metals or alloys. In some embodiments, the one or more metal foils may include a plurality of the metal foils formed of the same metal or alloy. In some embodiments, the one or more metal foils may include a plurality of the metal foils formed of different metals or alloys.

In some embodiments, welding the one or more metal foils at least partially within the channel may include filling the channel with the one or more metal foils. In some embodiments, the method also may include removing excess material of the one or more metal foils positioned outside of the channel. In some embodiments, welding the one or more metal foils at least partially within the channel may include separately welding a plurality of the metal foils at least partially within the channel. In some embodiments, welding the one or more metal foils at least partially within the channel may include simultaneously welding a plurality of the metal foils at least partially within the channel. In some embodiments, the method also may include: removing material from the one or more metal foils after welding the one or more metal foils at least partially within the channel; and welding, via the sonotrode, one or more additional metal foils at least partially within the channel after removing material from the one or more metal foils. In some embodiments, the method also may include texturing, via the sonotrode, the channel prior to welding the one or more metal foils at least partially within the channel.

These and other aspects and improvements of the present disclosure will become apparent to one of ordinary skill in the art upon review of the following detailed description when taken in conjunction with the several drawings and the appended claims.

BRIEF DESCRIPTION OF THE DRAWINGS

FIG. 2D is a detailed front view of a portion of the sonotrode of FIG. 2A, illustrating a welding surface having a contoured profile that includes a V-shaped profile.

FIG. 2E is a detailed front view of a portion of the sonotrode of FIG. 2A, illustrating a welding surface having a contoured profile that includes a V-shaped profile and a curved profile.

FIG. 2F is a detailed front view of a portion of the sonotrode of FIG. 2A, illustrating a welding surface having a contoured profile that includes a curved profile having a constant radius of curvature.

FIG. 2G is a detailed front view of a portion of the sonotrode of FIG. 2A, illustrating a welding surface having a contoured profile that includes a curved profile having a variable radius of curvature.

FIG. 3A is a top view of a first metal structure and a second metal structure positioned adjacent one another. FIG. 3B is a cross-sectional view of the first and second metal structures of FIG. 3A. FIG. 3C is a cross-sectional view of the first and second metal structures, illustrating creating a first channel along a first side of an interface between the first and second metal structures. FIG. 3D is a cross-sectional view of the first and second metal structures, illustrating texturing of the first channel via a sonotrode. FIG. 3E is a cross-sectional view of the first and second metal structures, illustrating welding of a plurality of first metal foils at least partially within the first channel via the sonotrode. FIG. 3F is a cross-sectional view of the first and second metal structures, illustrating removing excess material of the first metal foils. FIG. 3G is a cross-sectional view of the first and second metal structures, illustrating creating a second channel along a second side of the interface between the first and second metal structures. FIG. 3H is a cross-sectional view of the first and second metal structures, illustrating texturing of the second channel via the sonotrode. FIG. 3I is a cross-sectional view of the first and second metal structures, illustrating welding of a plurality of second metal foils at least partially within the second channel via the sonotrode. FIG. 3J is a cross-sectional view of the first and second metal structures, illustrating removing excess material of the second metal foils.

FIG. 4A is a top view of a first metal structure and a second metal structure positioned adjacent one another. FIG. 4B is a cross-sectional view of the first and second metal structures of FIG. 4A. FIG. 4C is a cross-sectional view of the first and second metal structures, illustrating creating a first channel along a first side of an interface between the first and second metal structures. FIG. 4D is a cross-sectional view of the first and second metal structures, illustrating texturing of the first channel via a sonotrode. FIG. 4E is a cross-sectional view of the first and second metal structures, illustrating welding of a plurality of first metal foils at least partially within the first channel via the sonotrode. FIG. 4F is a cross-sectional view of the first and second metal structures, illustrating removing excess material of the first metal foils. FIG. 4G is a cross-sectional view of the first and second metal structures, illustrating creating a second channel along a second side of the interface between the first and second metal structures. FIG. 4H is a cross-sectional view of the first and second metal structures, illustrating texturing of the second channel via the sonotrode. FIG. 4I is a cross-sectional view of the first and second metal structures, illustrating welding of a plurality of second metal foils at least partially within the second channel via the sonotrode. FIG. 4J is a cross-sectional view of the first and second metal structures, illustrating removing excess material of the second metal foils.

FIG. 5A is a top view of a first metal structure and a second metal structure positioned adjacent one another. FIG. 5B is a cross-sectional view of the first and second metal structures of FIG. 5A. FIG. 5C is a cross-sectional view of the first and second metal structures, illustrating creating a first channel along a first side of an interface between the first and second metal structures. FIG. 5D is a cross-sectional view of the first and second metal structures, illustrating texturing of the first channel via a sonotrode. FIG. 5E is a cross-sectional view of the first and second metal structures, illustrating welding of a plurality of first metal foils at least partially within the first channel via the sonotrode. FIG. 5F is a cross-sectional view of the first and second metal structures, illustrating removing excess material of the first metal foils. FIG. 5G is a cross-sectional view of the first and second metal structures, illustrating creating a second channel along a second side of the interface between the first and second metal structures. FIG. 5H is a cross-sectional view of the first and second metal structures, illustrating texturing of the second channel via the sonotrode. FIG. 5I is a cross-sectional view of the first and second metal structures, illustrating welding of a plurality of second metal foils at least partially within the second channel via the sonotrode. FIG. 5J is a cross-sectional view of the first and second metal structures, illustrating removing excess material of the second metal foils.

FIG. 6A is a top view of a first metal structure and a second metal structure positioned adjacent one another. FIG. 6B is a cross-sectional view of the first and second metal structures of FIG. 6A. FIG. 6C is a cross-sectional view of the first and second metal structures, illustrating creating a first channel along a first side of an interface between the first and second metal structures. FIG. 6D is a cross-sectional view of the first and second metal structures, illustrating texturing of the first channel and welding of a portion of the second metal structure to a portion of the first metal structure via a sonotrode. FIG. 6E is a cross-sectional view of the first and second metal structures, illustrating welding of a plurality of first metal foils at least partially within the first channel via the sonotrode. FIG. 6F is a cross-sectional view of the first and second metal structures, illustrating removing excess material of the first metal foils. FIG. 6G is a cross-sectional view of the first and second metal structures, illustrating creating a second channel along a second side of the interface between the first and second metal structures. FIG. 6H is a cross-sectional view of the first and second metal structures, illustrating texturing of the second channel and welding of a portion of the first metal structure to a portion of the second metal structure via the sonotrode. FIG. 6I is a cross-sectional view of the first and second metal structures, illustrating welding of a plurality of second metal foils at least partially within the second channel via the sonotrode. FIG. 6J is a cross-sectional view of the first and second metal structures, illustrating removing excess material of the second metal foils.

FIG. 7A is a top view of a metal structure having a defect. FIG. 7B is a cross-sectional view of the metal structure of FIG. 7A. FIG. 7C is a cross-sectional view of the metal structure, illustrating creating a channel in the metal structure such that the defect is removed. FIG. 7D is a cross-sectional view of the metal structure, illustrating texturing of the channel via a sonotrode. FIG. 7E is a cross-sectional view of the metal structure, illustrating welding of a plurality of metal foils at least partially within the channel via the sonotrode. FIG. 7F is a cross-sectional view of the metal structure, illustrating removing excess material of the metal foils.

FIG. 8A is a cross-sectional view of the first and second metal structures, illustrating creating a third channel along the first side of the interface between the first and second metal structures. FIG. 8B is a cross-sectional view of the first and second metal structures, illustrating texturing of the third channel via a second sonotrode. FIG. 8C is a cross-sectional view of the first and second metal structures, illustrating welding of a plurality of third metal foils at least partially within the third channel via the second sonotrode. FIG. 8D is a cross-sectional view of the first and second metal structures, illustrating removing excess material of the third metal foils.

FIGS. 9A-9D, when viewed in conjunction with FIGS. 7A-7F, illustrate a method of using two different sonotrodes including respective welding surfaces having different profiles for repairing a defect in a metal structure using ultrasonic additive manufacturing in accordance with one or more embodiments of the disclosure. FIG. 9A is a cross-sectional view of the metal structure, illustrating creating a second channel along the first side of the metal structure. FIG. 9B is a cross-sectional view of the metal structure, illustrating texturing of the second channel via a second sonotrode. FIG. 9C is a cross-sectional view of the metal structure, illustrating welding of a plurality of second metal foils at least partially within the second channel via the second sonotrode. FIG. 9D is a cross-sectional view of the metal structure, illustrating removing excess material of the second metal foils.

Figure 1:
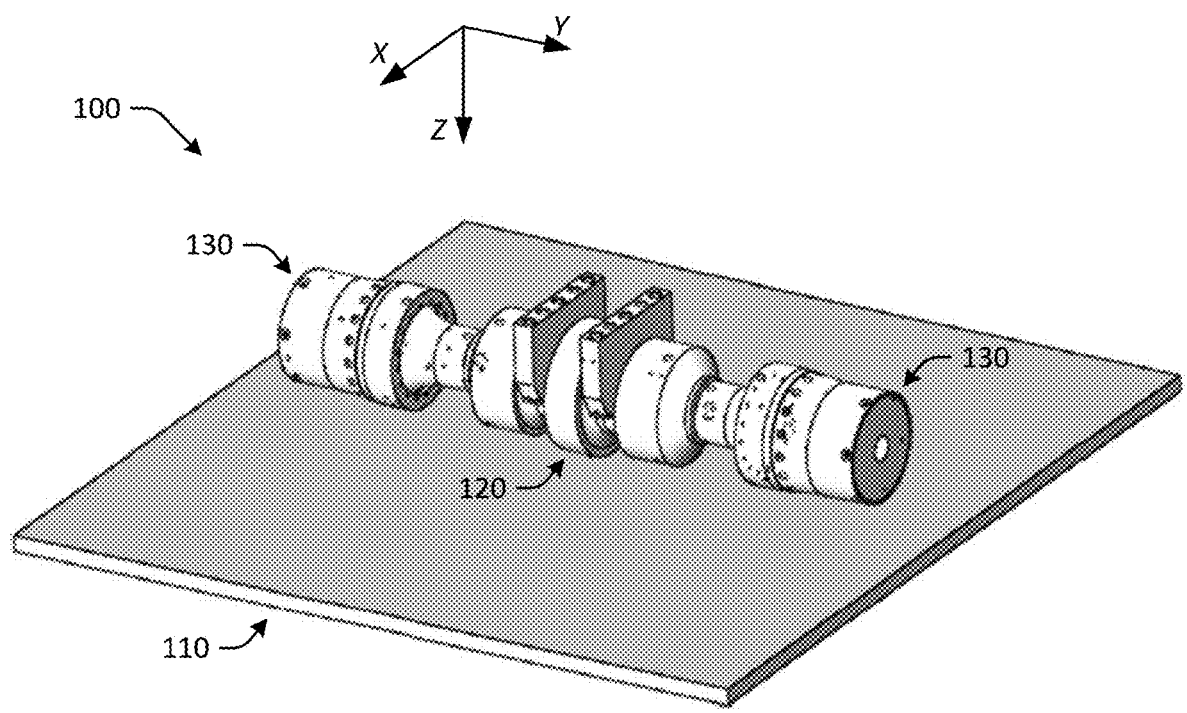
FIG. 1 is a perspective view of an ultrasonic additive manufacturing system, showing a base structure, a sonotrode, and a pair of transducers of the system.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF THE DISCLOSURE

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. In some instances, well known methods, procedures, components, and circuits have not been described in detail so as not to unnecessarily obscure aspects of the embodiments.

Embodiments of ultrasonic additive manufacturing systems and related methods of using such systems for joining metal structures and repairing metal structures are provided. An example ultrasonic additive manufacturing system may include a base structure, a sonotrode configured to rotate about an axis of rotation, and one or more transducers configured to vibrate the sonotrode. As described herein, the sonotrode may include a welding surface that extends along a circumference of the sonotrode and has a contoured profile. For example, the contoured profile may include a V-shaped profile and/or a curved profile. As noted above, conventional sonotrodes including a welding surface having a flat profile generally may be unable to produce good welds for interfaces that are normal to the x-y plane. The contoured profile of the sonotrode described herein advantageously may be used to eliminate interfaces that are normal to the x-y plane, thereby minimizing the formation of cracks or areas of weakness that typically are created by conventional techniques.

The ultrasonic additive manufacturing systems described herein may be used for joining metal structures as well as repairing metal structures. In joining applications, a first metal structure and a second metal structure may be positioned adjacent one another, and a channel having a contoured profile may be created along a side of an interface between the first metal structure and the second metal structure. The sonotrode then may be used to weld one or more metal foils within the channel, thereby joining the first metal structure and the second metal structure. In repair applications, a channel having a contoured profile may be created in a metal structure such that a defect is removed from the metal structure. The sonotrode then may be used to weld one or more metal foils within the channel, thereby repairing the metal structure.

As compared to conventional fusion-based welding techniques, the ultrasonic additive manufacturing systems and related methods provided herein may provide several benefits. First, because ultrasonic additive manufacturing is a solid-state joining method, peak temperatures are maintained far below the melting point of the metals being joined. Second, ultrasonic additive manufacturing produces high integrity welds without any heat affected zone or thermally-induced stresses and preserves the temper of the material being welded. Third, ultrasonic additive manufacturing can be used with many different metals and alloys including, for example, aluminum, steel, copper, titanium, and tantalum. Fourth, ultrasonic additive manufacturing can be used to join many different dissimilar metal pairs, such that the metal foils may have a different composition than the base structure to which the metal foils are welded and/or some of the metal foils may have a different composition than other metal foils.

The ultrasonic additive manufacturing systems and related methods described herein may be used in a variety of applications. For example, such systems and methods may be used in joining or repairing aerospace structures, automotive structures, or oil and gas pipeline structures. The joining techniques described herein may be particularly useful in aerospace applications in which it is undesirable to join metal structures with fasteners due to the resulting impact on aerodynamic performance. Additionally, the repair techniques described herein may be particularly advantageous in oil and gas pipeline applications in which existing approaches for repairing defects may be cumbersome, costly, and time consuming. Further applications and benefits of the described ultrasonic additive manufacturing systems and methods will be appreciated by those of ordinary skill in the art in view of the teachings provided herein.

FIG. 1 depicts a known ultrasonic additive manufacturing system 100 (also referred to herein simply as a "system"). The ultrasonic additive manufacturing system 100 is configured for solid-state welding of metal foil feedstock using high-power ultrasonic vibrations. As shown in FIG. 1, the system 100 includes a base structure 110, a sonotrode 120, and a pair of transducers 130. The base structure 110 is configured for supporting a metal structure for welding metal foils thereon. The sonotrode 120 is configured for welding the metal foils onto the metal structure. The transducers 130 are configured for vibrating the sonotrode 120. During use of the system 100, the sonotrode 120 may roll over each layer of metal foil longitudinally (x-direction) to weld the metal foil to the metal structure. While rolling, the sonotrode 120 may apply vertical (z-direction) pressure to the metal foil and also may grip the metal foil and apply lateral (y-direction) displacements to provide a scrubbing action and plastic deformation between the metal foil and the metal structure, creating intimate metal-to-metal contact that results in solid-state welding. As shown in FIG. 1, the sonotrode 120 has a conventional, cylindrical shape, such that the welding surface extending along the circumference of the sonotrode 120 has a flat profile. Due to the flat profile, the scrubbing motion provided by the sonotrode 120 generally may be unable to produce good welds for interfaces that are normal to the x-y plane. Accordingly, when using the sonotrode 120 to weld a conventional, flat, thin metal foil, the edges of the metal foil typically cannot be welded well to adjacent metal foils or metal structure, leaving cracks or weak areas in the build.

Figure 2A:
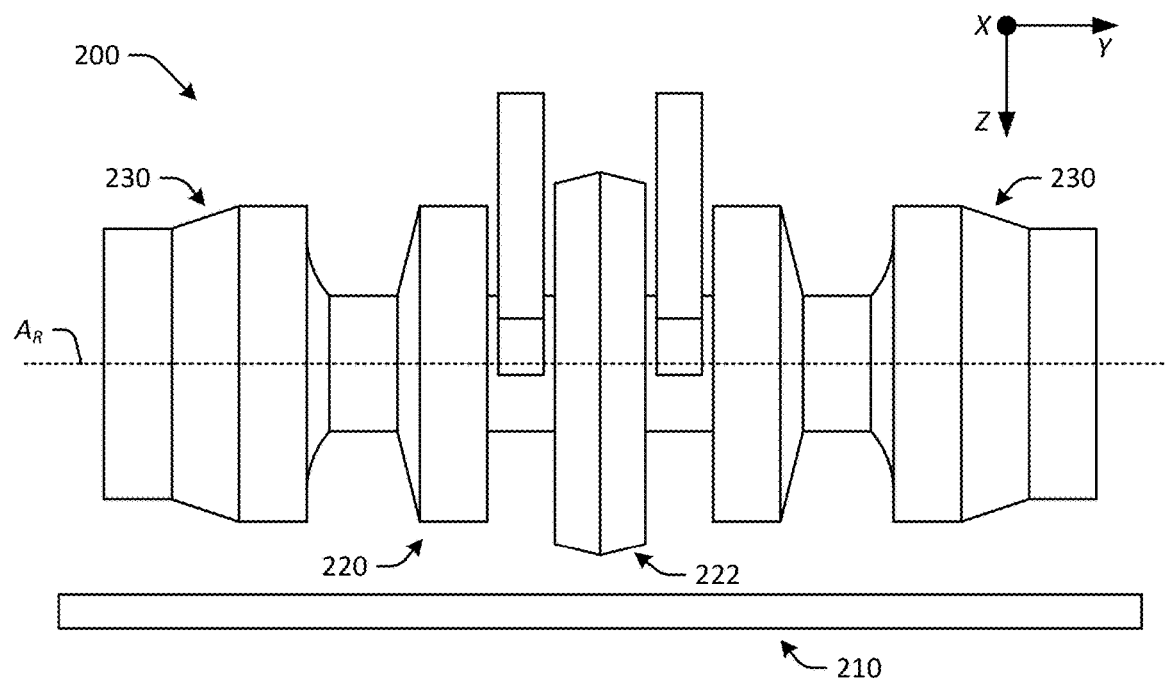
FIG. 2A is a front view of an ultrasonic additive manufacturing system in accordance with one or more embodiments of the disclosure, showing a base structure, a sonotrode, and a pair of transducers of the system.

Referring now to FIG. 2A, an ultrasonic additive manufacturing system 200 (also referred to herein simply as a "system") in accordance with one or more embodiments of the disclosure is depicted. The ultrasonic additive manufacturing system 200 is configured for solid-state welding of metal foil feedstock using high-power ultrasonic vibrations. For example, the ultrasonic additive manufacturing system 200 may be used for joining metal structures as well as repairing defects in metal structures, as described below. In some embodiments, the ultrasonic additive manufacturing system 200 may be integrated as a part of a larger manufacturing system that also provides various machining or forming operations. As shown in FIG. 2A, the ultrasonic additive manufacturing system 200 may include a base structure 210, a sonotrode 220, and a pair of transducers 230. The base structure 210 is configured for supporting a metal structure for welding metal foils thereon. The sonotrode 220 is configured for welding the metal foils onto the metal structure. The transducers 230 are configured for vibrating the sonotrode 220. During use of the system 200, the sonotrode 220 may roll over each layer of metal foil longitudinally (x-direction) to weld the metal foil to the metal structure. While rolling, the sonotrode 220 may apply vertical (z-direction) pressure to the metal foil and also may grip the metal foil and apply lateral (y-direction) displacements to provide a scrubbing action and plastic deformation between the metal foil and the metal structure, creating intimate metal-to-metal contact that results in solid-state welding.

In some embodiments, as shown, the base structure 210 (which also may be referred to as an "anvil") may be formed as a planar member with a flat top surface configured for supporting a metal structure thereon during use of the system 200. Other shapes and configurations of the base structure 210 may be used in other embodiments, for example, to support metal structures having non-planar shapes or surfaces. At least one of the base structure 210 and the sonotrode 220 may be configured to translate longitudinally (x-direction) relative to the other of the base structure 210 and the sonotrode 220. In some embodiments, the base structure 210 may be configured to translate longitudinally relative to the sonotrode 220. In some embodiments, the sonotrode 220 may be configured to translate longitudinally relative to the base structure 210. In some embodiments, the base structure 210 and the sonotrode 220 each may be configured to translate longitudinally relative to one another.

The transducers 230 may be ultrasonic transducers configured for vibrating the sonotrode 220 laterally (y-direction) relative to the base structure 210 during use of the system 200. In this manner, high-power ultrasonic vibrations may be induced to facilitate the scrubbing action and plastic deformation between the metal foil and the metal structure. Although two transducers 230 are shown in FIG. 2A, in some embodiments, a single transducer 230 may be used to vibrate the sonotrode 220.

Figures 2B, 2C:
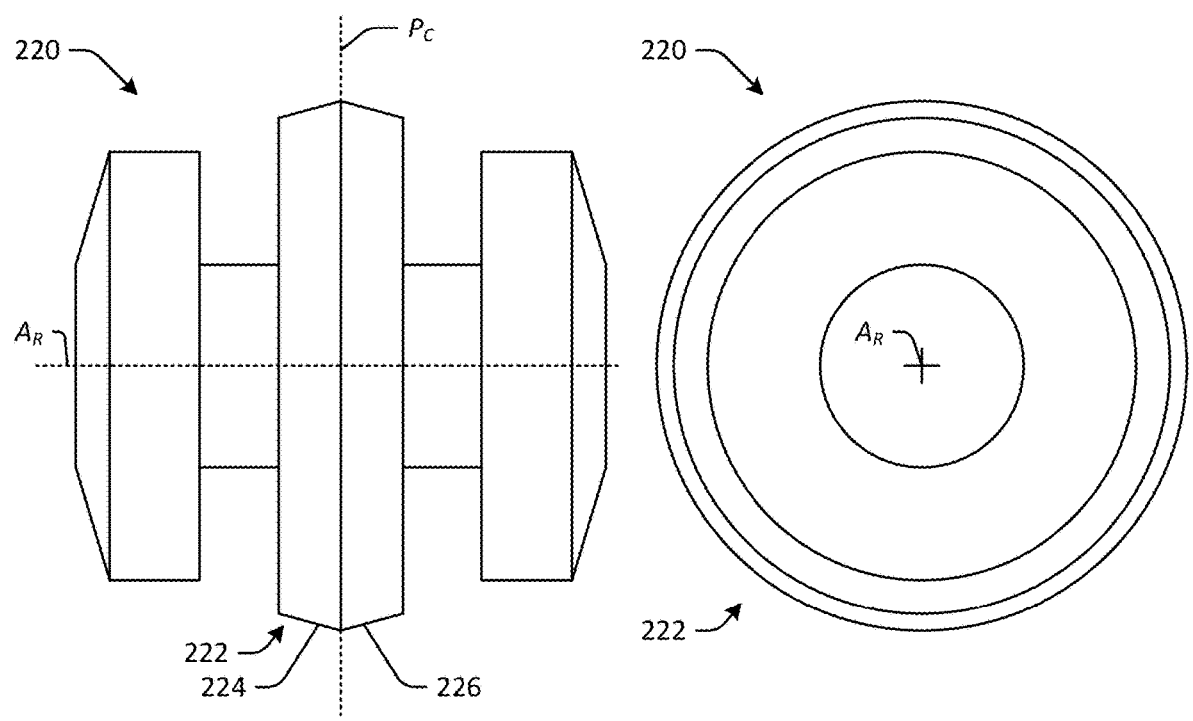
FIG. 2B is a detailed front view of the sonotrode of FIG. 2A.
FIG. 2C is a detailed side view of the sonotrode of FIG. 2A.

The sonotrode 220 may be configured to rotate about an axis of rotation $A_R$ during use of the system 200. In this manner, the rotation of the sonotrode 220 and the relative longitudinal translation between the sonotrode 220 and the base structure 210 may facilitate the rolling of the sonotrode 220 over a metal foil longitudinally (x-direction) to weld the metal foil to the metal structure. As shown in FIGS. 2A-2C, the sonotrode 220 may include a welding surface 222 extending along the circumference of the sonotrode 220 and having a contoured profile. In contrast to conventional sonotrodes including a welding surface having a flat profile, the contoured profile of the welding surface 222 may be used to eliminate interfaces that are normal to the x-y plane. As shown in FIG. 2B, the sonotrode 220 may have a central plane $P_C$ extending perpendicular to the axis of rotation $A_R$ and bisecting the sonotrode 220 in the direction of the axis of rotation $A_R$. In this manner, the welding surface 222 may have a first side portion 224 along a first side of the sonotrode 220 and a second side portion 226 along an opposite second side of the sonotrode 220. In some embodiments, the contoured profile may be symmetric about the central plane $P_C$, such that the first side portion 224 and the second side portion 226 are mirror images of one another. In other embodiments, the contoured profile may be asymmetric about the central plane $P_C$. In some embodiments, at least a portion of the contoured profile may be nonparallel to the axis of rotation $A_R$. In some embodiments, an entirety of the contoured profile may be nonparallel to the axis of rotation $A_R$. In some embodiments, the welding surface 222 may include a surface texture, which may be used to facilitate texturing of a metal structure, as described below.

FIG. 2D depicts an example contoured profile of the welding surface 222 of the sonotrode 220. As shown, the contoured profile may include a V-shaped profile defined by the first side portion 224 and the second side portion 226 of the welding surface 222. In this manner, the V-shaped profile may have an included angle α, and each side portion 224, 226 may define a respective side angle β relative to a line extending along the circumference of the sonotrode 220 and parallel to the axis of rotation $A_R$. In some embodiments, the included angle α may be between 60 degrees and 179 degrees. Various values of the included angle α may be used in different applications. The first side portion 224 and the second side portion 226 may converge at a central portion 228 of the welding surface 222. In some embodiments, as shown, the contoured profile may be formed such that the first side portion 224 and the second side portion 226 converge at a point along at the central portion 228. Other configurations of the central portion 228 may be used in other embodiments, as described below.

FIG. 2E depicts another example contoured profile of the welding surface 222 of the sonotrode 220. As shown, the contoured profile may include a V-shaped profile defined by the first side portion 224 and the second side portion 226 of the welding surface 222 as well as a curved profile defined by the central portion 228 of the welding surface 222. The V-shaped profile may have an included angle α, and each side portion 224, 226 may define a respective side angle β relative to a line extending along the circumference of the sonotrode 220 and parallel to the axis of rotation $A_R$. In some embodiments, the included angle α may be between 60 degrees and 179 degrees. Various values of the included angle α may be used in different applications. The central portion 228 may have a radius R defining the curvature of the curved profile. In some embodiments, the radius R may be constant along the central portion 228 in the direction from the first side portion 224 to the second side portion 226. In some embodiments, the radius R may vary along the central portion 228 in the direction from the first side portion 224 to the second side portion 226. Various values of the radius R may be used in different applications, for example, to minimize stress concentrations in metal structures and metal foils engaged by the central portion 228.

FIG. 2F depicts still another example contoured profile of the welding surface 222 of the sonotrode 220. As shown, the contoured profile may include a curved profile defined by the first side portion 224, the second side portion 226, and the central portion 228 of the welding surface 222. As shown, the curved profile may have a radius R that is constant along the first side portion 224, the second side portion 226, and the central portion 228. Various values of the radius R may be used in different applications.

FIG. 2G depicts yet another example contoured profile of the welding surface 222 of the sonotrode 220. As shown, the contoured profile may include a curved profile defined by the first side portion 224, the second side portion 226, and the central portion 228 of the welding surface 222. As shown, the curved profile may have a radius R that varies along the first side portion 224, the second side portion 226, and the central portion 228. Various values of the radius R may be used in different applications.

It will be appreciated that the contoured profiles depicted in FIGS. 2D-2G provide merely a few examples of how the contoured profile of the welding surface 222 of the sonotrode 220 may be configured. Other configurations of the welding surface 222 may be used to provide a contoured profile that differs from the flat profile of the welding surface of conventional, cylindrical sonotrodes.

Figure 3A:
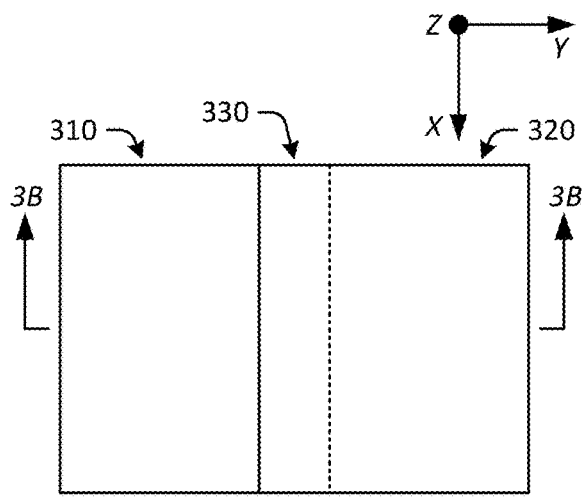
FIGS. 3A-3J illustrate a method for joining a first metal structure and a second metal structure using ultrasonic additive manufacturing in accordance with one or more embodiments of the disclosure.
Figure 3B:
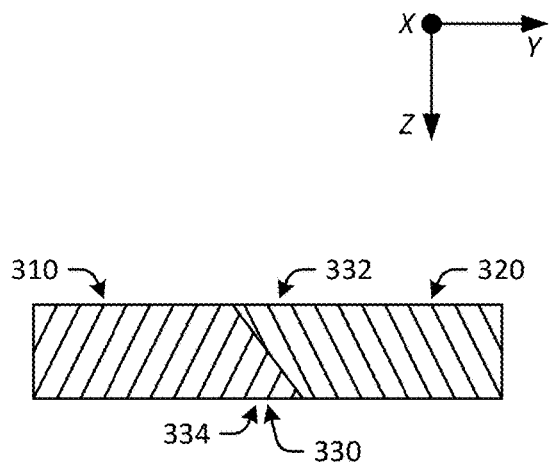

FIGS. 3A-3J depict an example method for joining a first metal structure 310 and a second metal structure 320 using ultrasonic additive manufacturing in accordance with one or more embodiments of the disclosure. As shown in FIGS. 3A and 3B, the first metal structure 310 and the second metal structure 320 may be positioned adjacent one another. For example, the first and second metal structures 310, 320 may be positioned adjacent one another on the base structure 210 and fixed in place. In some embodiments, as shown, the first and second metal structures 310, 320 may be formed as plates or sheets having a generally planar shape, although other shapes, such as curved or otherwise contoured shapes, of the first and second metal structures 310, 320 may be used in other embodiments. As shown, the first and second metal structures 310, 320 may contact one another at an interface 330. In some embodiments, as shown, the interface 330 may extend in a linear manner along respective edges of the first and second metal structures 310, 320, although other configurations of the interface 330 and the mating edges of the first and second metal structures 310, 320 may be used in other embodiments. In some embodiments, as shown, the first and second metal structures 310, 320 may contact one another at a scarf joint formed by mating angled surfaces along the edges of the first and second metal structures 310, 320, although other types of joints may be used in other embodiments. In some embodiments, the first and second metal structures 310, 320 may be formed of the same metal or alloy. In some embodiments, the first and second metal structures 310, 320 may be formed of different metals or alloys.

Figure 3C:

With the first and second metal structures 310, 320 positioned adjacent one another and fixed, a first channel 340 may be created along a first side 332 of the interface 330 between the first and second metal structures 310, 320, as shown in FIG. 3C. As shown, the first channel 340 may have a contoured profile. For example, the contoured profile of the first channel 340 may include a V-shaped profile, as shown, although other types of contoured profiles, such as those described above, may be used in other embodiments. In some embodiments, the first channel 340 may be machined along the first side 332. For example, an angled milling cutter 342 may be used to machine the first channel 340 by rotating the cutter 342 and translating the cutter 342 longitudinally (x-direction) along the first side 332 of the interface 330. One or more passes of the angled milling cutter 342 may be used to create the first channel 340. In other embodiments, alternative machining or metal forming techniques may be used to create the first channel 340. As shown, the maximum depth of the first channel 340 may be less than the thickness of the first and second metal structures 310, 320 at the interface 330. In this manner, the first channel 340 may be spaced apart from a second side 334 of the interface 330. As shown, a first portion of the first channel 340 may be defined by the first metal structure 310, and a second portion of the first channel 340 may be defined by the second metal structure 320. In some embodiments, as shown, the first channel 340 may be symmetric about the interface 330.

Figure 3D:

In some embodiments, the first channel 340 may be textured via the sonotrode 220, as shown in FIG. 3D. For example, the sonotrode 220 may be rolled longitudinally (x-direction) along the first channel 340 while the sonotrode 220 applies pressure vertically (z-direction) to the respective portions of the first and second metal structures 310, 320 and is vibrated laterally (y-direction) by the transducers 230. In this manner, the surfaces of the first channel 340 may be textured by the surface texture of the sonotrode 220. In some embodiments, the contoured profile of the first channel 340 may be the same as the contoured profile of the welding surface 222 of the sonotrode 220. In some embodiments, the contoured profile of the first channel 340 may be different from the contoured profile of the welding surface 222 of the sonotrode 220.

Figure 3E:
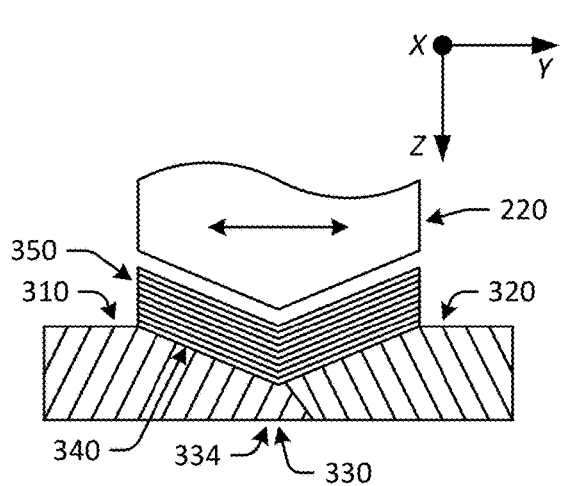

As shown in FIG. 3E, one or more first metal foils 350 may be welded at least partially within the first channel 340 via the sonotrode 220. For example, a first metal foil 350 may be positioned over the first channel 340, for example, via a tape feeder, and the sonotrode 220 may be used to weld the first metal foil 350 at least partially within the first channel 340. The sonotrode 220 may be rolled longitudinally (x-direction) over the first metal foil 350 and along the first channel 340 while the sonotrode 220 applies pressure vertically (z-direction) to the first metal foil 350 and is vibrated laterally (y-direction) by the transducers 230 to provide a scrubbing action and plastic deformation between the first metal foil 350 and the respective portions of the first and second metal structures 310, 320, resulting in solid-state welding.

In some embodiments, as shown, the one or more first metal foils 350 may fill the first channel 340. In some embodiments, a single first metal foil 350 may be welded at least partially within the first channel 340. In some embodiments, a plurality of the first metal foils 350 may be welded at least partially within the first channel 340. Although nine of the first metal foils 350 are depicted in FIG. 3E, any number of the first metal foils 350 may be used. In some embodiments, a plurality of the first metal foils 350 may be separately welded at least partially within the first channel 340. In other words, the first metal foils 350 may be welded one at a time. In some embodiments, a plurality of the first metal foils 350 may be simultaneously welded at least partially within the first channel 340. In other words, two or more or the first metal foils 350 may be welded at the same time. In some embodiments, material may be removed from one or more of the welded first metal foils 350, such as by machining, prior to welding one or more additional first metal foils 350. For example, material may be removed from one or more first metal foils 350 after welding the one or more first metal foils 350 at least partially within the first channel 340, and then one or more additional first metal foils 350 may be welded at least partially within the first channel 340.

In some embodiments, the first and second metal structures 310, 320 and the one or more first metal foils 350 may be formed of the same metal or alloy. In some embodiments, the first metal structure 310 may be formed of a first metal or alloy, the second metal structure 320 may be formed of a second metal or alloy different from the first metal or alloy, and the one or more first metal foils 350 may be formed of a third metal or alloy different from each of the first metal or alloy and the second metal or alloy. In some embodiments, the one or more first metal foils 350 may include a plurality of the first metal foils 350 formed of the same metal or alloy. In some embodiments, the one or more first metal foils 350 may include a plurality of the first metal foils 350 formed of different metals or alloys.

Figure 3F:
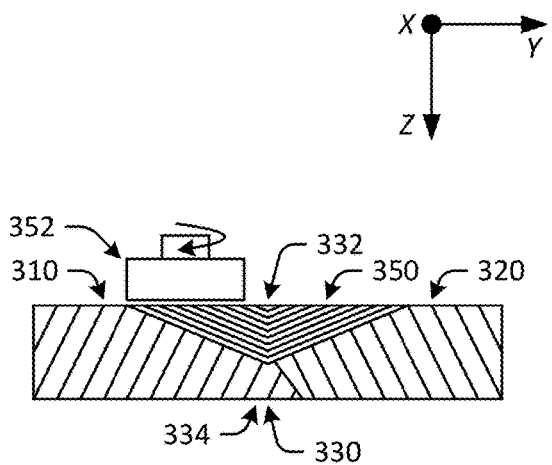

In some embodiments, excess material of the one or more first metal foils 350 may be removed, as shown in FIG. 3F. For example, material of the one or more first metal foils 350 positioned outside of the first channel 340 may be removed. In some embodiments, as shown, excess material of the one or more first metal foils 350 may be removed such that the remaining material of the one or more first metal foils 350 is flush with the respective surfaces of the first and second metal structures 310, 320 along the interface 330. For example, a square milling cutter 352 may be used to remove excess material of the one or more first metal foils 350 by rotating the cutter 352 and translating the cutter 352 longitudinally (x-direction) along the first side 332 of the interface 330. One or more passes of the square milling cutter 352 may be used to remove the excess material. In other embodiments, alternative machining techniques may be used to remove the excess material.

In some applications, the joining of the first and second metal structures 310, 320 along the first side 332 of the interface 330 via the one or more first metal foils 350 may be adequate. In other applications, it may be desirable to join the first and second metal structures 310, 320 along the second side 334 of the interface 330 as well. In some embodiments, the assembly of the first and second metal structures 310, 320 and the one or more first metal foils 350 may be removed from the base structure 210, flipped over, and replaced on the base structure 210 for subsequent operations depicted in FIGS. 3G-3J. Other techniques for joining the first and second metal structures 310, 320 along the second side 334 of the interface 330 may be used in other embodiments.

Figure 3G:
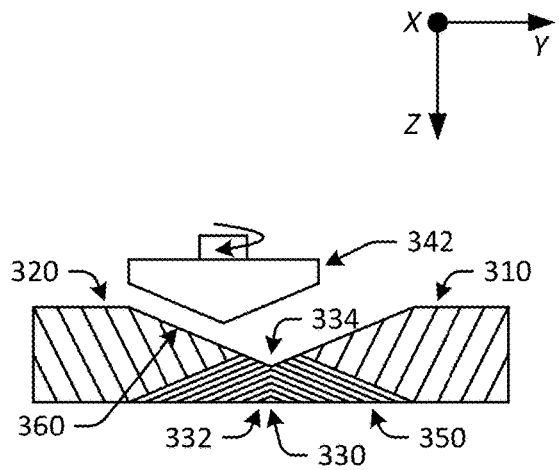

As shown in FIG. 3G, a second channel 360 may be created along the second side 334 of the interface 330 between the first and second metal structures 310, 320. As shown, the second channel 360 may have a contoured profile. For example, the contoured profile of the second channel 360 may include a V-shaped profile, as shown, although other types of contoured profiles, such as those described above, may be used in other embodiments. In some embodiments, the contoured profile of the second channel 360 may be the same as the contoured profile of the first channel 340. In some embodiments, the contoured profile of the second channel 360 may be different from the contoured profile of the first channel 340. In some embodiments, the second channel 360 may be machined along the second side 334. For example, the angled milling cutter 342 may be used to machine the second channel 360 by rotating the cutter 342 and translating the cutter 342 longitudinally (x-direction) along the second side 334 of the interface 330. One or more passes of the angled milling cutter 342 may be used to create the second channel 360. In other embodiments, alternative machining or metal forming techniques may be used to create the second channel 360. As shown, the maximum depth of the second channel 360 may be less than the thickness of the first and second metal structures 310, 320 at the interface 330. In this manner, the second channel 360 may be spaced apart from the first side 332 of the interface 330. As shown, a first portion of the second channel 360 may be defined by the first metal structure 310, and a second portion of the second channel 360 may be defined by the second metal structure 320. In some embodiments, as shown, a third portion of the second channel 360 may be defined by the one or more first metal foils 350. In this manner, a portion of the one or more first metal foils 350 may be removed during creation of the second channel 360. In some embodiments, as shown, the second channel 360 may be symmetric about the interface 330.

Figure 3H:
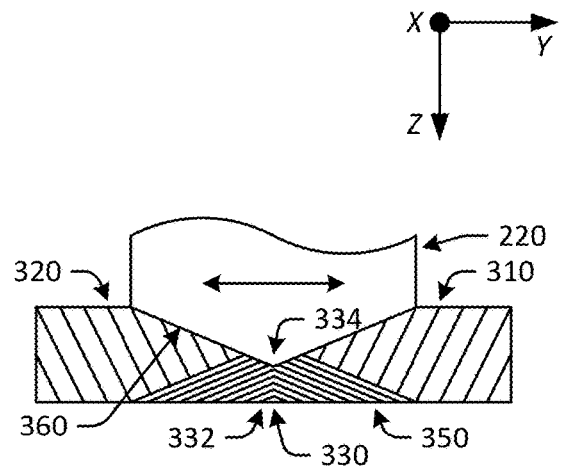

In some embodiments, the second channel 360 may be textured via the sonotrode 220, as shown in FIG. 3H. For example, the sonotrode 220 may be rolled longitudinally (x-direction) along the second channel 360 while the sonotrode 220 applies pressure vertically (z-direction) to the respective portions of the first and second metal structures 310, 320 and the one or more first metal foils 340 and is vibrated laterally (y-direction) by the transducers 230. In this manner, the surfaces of the second channel 360 may be textured by the surface texture of the sonotrode 220. In some embodiments, the contoured profile of the second channel 360 may be the same as the contoured profile of the welding surface 222 of the sonotrode 220. In some embodiments, the contoured profile of the second channel 360 may be different from the contoured profile of the welding surface 222 of the sonotrode 220.

Figure 3I:
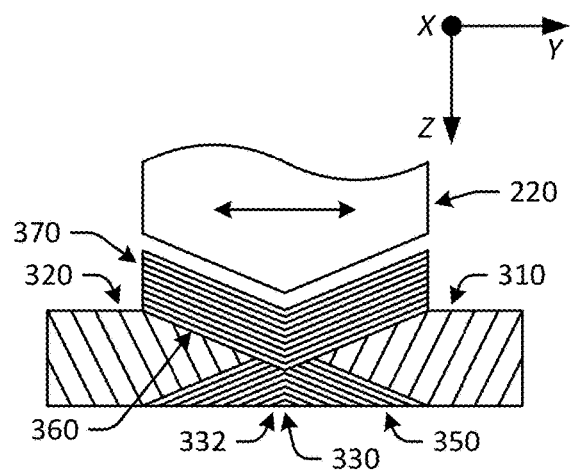

As shown in FIG. 3I, one or more second metal foils 370 may be welded at least partially within the second channel 360 via the sonotrode 220. For example, a second metal foil 370 may be positioned over the second channel 360, for example, via a tape feeder, and the sonotrode 220 may be used to weld the second metal foil 370 at least partially within the second channel 360. The sonotrode 220 may be rolled longitudinally (x-direction) over the second metal foil 370 and along the second channel 360 while the sonotrode 220 applies pressure vertically (z-direction) to the second metal foil 370 and is vibrated laterally (y-direction) by the transducers 230 to provide a scrubbing action and plastic deformation between the second metal foil 370 and the respective portions of the first and second metal structures 310, 320 and the one or more first metal foils 350, resulting in solid-state welding.

In some embodiments, as shown, the one or more second metal foils 370 may fill the second channel 360. In some embodiments, a single second metal foil 370 may be welded at least partially within the second channel 360. In some embodiments, a plurality of the second metal foils 370 may be welded at least partially within the second channel 360. Although nine of the second metal foils 370 are depicted in FIG. 3I, any number of the second metal foils 370 may be used. In some embodiments, a plurality of the second metal foils 370 may be separately welded at least partially within the second channel 360. In other words, the second metal foils 370 may be welded one at a time. In some embodiments, a plurality of the second metal foils 370 may be simultaneously welded at least partially within the second channel 360. In other words, two or more or the second metal foils 370 may be welded at the same time. In some embodiments, material may be removed from one or more of the welded second metal foils 370, such as by machining, prior to welding one or more additional second metal foils 370. For example, material may be removed from one or more second metal foils 370 after welding the one or more second metal foils 370 at least partially within the second channel 360, and then one or more additional second metal foils 370 may be welded at least partially within the second channel 360.

In some embodiments, the first and second metal structures 310, 320 and the one or more second metal foils 370 may be formed of the same metal or alloy. In some embodiments, the first metal structure 310 may be formed of a first metal or alloy, the second metal structure 320 may be formed of a second metal or alloy different from the first metal or alloy, and the one or more second metal foils 370 may be formed of a third metal or alloy different from each of the first metal or alloy and the second metal or alloy. In some embodiments, the one or more second metal foils 370 may include a plurality of the second metal foils 370 formed of the same metal or alloy. In some embodiments, the one or more second metal foils 370 may include a plurality of the second metal foils 370 formed of different metals or alloys.

Figure 3J:
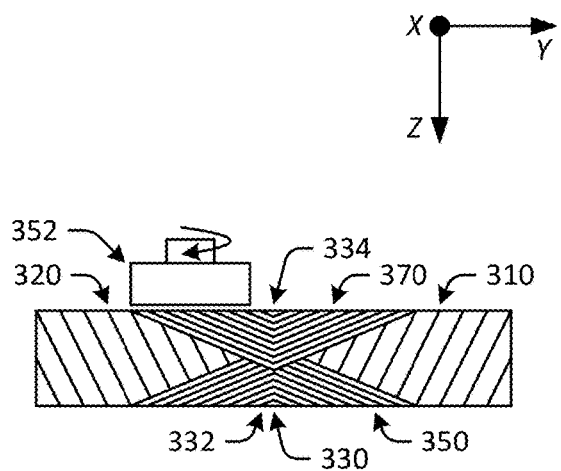

In some embodiments, excess material of the one or more second metal foils 370 may be removed, as shown in FIG. 3J. For example, material of the one or more second metal foils 370 positioned outside of the second channel 360 may be removed. In some embodiments, as shown, excess material of the one or more second metal foils 370 may be removed such that the remaining material of the one or more second metal foils 370 is flush with the respective surfaces of the first and second metal structures 310, 320 along the interface 330. For example, the square milling cutter 352 may be used to remove excess material of the one or more second metal foils 370 by rotating the cutter 352 and translating the cutter 352 longitudinally (x-direction) along the second side 334 of the interface 330. One or more passes of the square milling cutter 352 may be used to remove the excess material. In other embodiments, alternative machining techniques may be used to remove the excess material.

Figure 4A:
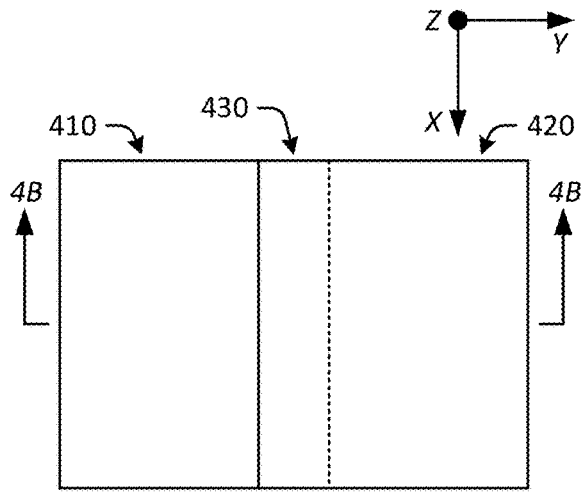
FIGS. 4A-4J illustrate a method for joining a first metal structure and a second metal structure using ultrasonic additive manufacturing in accordance with one or more embodiments of the disclosure.
Figure 4B:
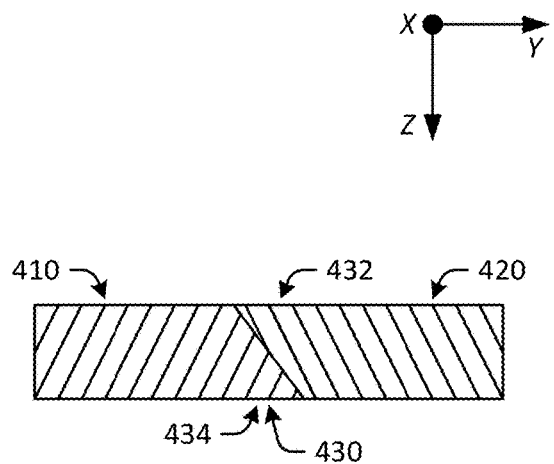

FIGS. 4A-4J depict an example method for joining a first metal structure 410 and a second metal structure 420 using ultrasonic additive manufacturing in accordance with one or more embodiments of the disclosure. It will be appreciated that the method of FIGS. 4A-4J is generally similar to the method of FIGS. 3A-3J. Certain differences relate to the relative depths of first and second channels created in the first and second metal structures 410, 420, and the number of metal foils welded within the first and second channels. As shown in FIGS. 4A and 4B, the first metal structure 410 and the second metal structure 420 may be positioned adjacent one another such that the first and second metal structures 410, 420 contact one another at an interface 430. In some embodiments, as shown, the first and second metal structures 410, 420 may contact one another at a scarf joint formed by mating angled surfaces along the edges of the first and second metal structures 410, 420, although other types of joints may be used.

Figure 4C:

With the first and second metal structures 410, 420 positioned adjacent one another and fixed, a first channel 440 may be created along a first side 432 of the interface 430, as shown in FIG. 4C. As shown, the first channel 440 may have a contoured profile. The contoured profile of the first channel 440 may include a V-shaped profile, as shown, although other types of contoured profiles, such as those described above, may be used in other embodiments. In some embodiments, the first channel 440 may be machined along the first side 432. For example, an angled milling cutter 442 may be used to machine the first channel 440 by rotating the cutter 442 and translating the cutter 442 longitudinally (x-direction) along the first side 432, although other machining or metal forming techniques may be used to create the first channel 440. As shown, the maximum depth of the first channel 440 may be less than half of the thickness of the first and second metal structures 410, 420 at the interface 430. In this manner, the first channel 440 may be spaced apart from a second side 434 of the interface 430. As shown, a first portion of the first channel 440 may be defined by the first metal structure 410, and a second portion of the first channel 440 may be defined by the second metal structure 420. In some embodiments, as shown, the first channel 440 may be symmetric about the interface 430.

Figure 4D:

In some embodiments, the first channel 440 may be textured via the sonotrode 220, as shown in FIG. 4D. For example, the sonotrode 220 may be rolled longitudinally (x-direction) along the first channel 440 while the sonotrode 220 applies pressure vertically (z-direction) to the respective portions of the first and second metal structures 410, 420 and is vibrated laterally (y-direction) by the transducers 230. In some embodiments, the contoured profile of the first channel 440 may be the same as the contoured profile of the welding surface 222 of the sonotrode 220. In some embodiments, the contoured profile of the first channel 440 may be different from the contoured profile of the welding surface 222 of the sonotrode 220.

Figure 4E:
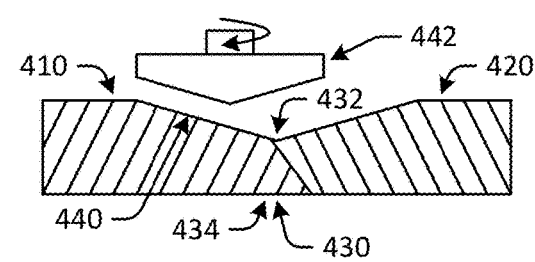

As shown in FIG. 4E, one or more first metal foils 450 may be welded at least partially within the first channel 440 via the sonotrode 220. For example, a first metal foil 450 may be positioned over the first channel 440, for example, via a tape feeder, and the sonotrode 220 may be used to weld the first metal foil 450 at least partially within the first channel 440. The sonotrode 220 may be rolled longitudinally (x-direction) over the first metal foil 450 and along the first channel 440 while the sonotrode 220 applies pressure vertically (z-direction) to the first metal foil 450 and is vibrated laterally (y-direction) by the transducers 230 to provide a scrubbing action and plastic deformation between the first metal foil 450 and the respective portions of the first and second metal structures 410, 420, resulting in solid-state welding. In some embodiments, as shown, the one or more first metal foils 450 may fill the first channel 440. In some embodiments, a single first metal foil 450 may be welded at least partially within the first channel 440. In some embodiments, a plurality of the first metal foils 450 may be welded at least partially within the first channel 440. Although seven of the first metal foils 450 are depicted in FIG. 4E, any number of the first metal foils 450 may be used.

Figure 4F:
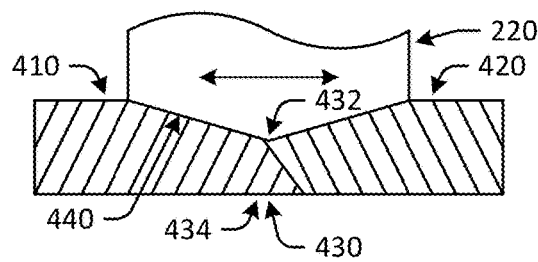

In some embodiments, excess material of the one or more first metal foils 450, such as the material positioned outside of the first channel 440, may be removed, as shown in FIG. 4F. In some embodiments, as shown, the excess material may be removed such that the remaining material of the one or more first metal foils 450 is flush with the respective surfaces of the first and second metal structures 410, 420 along the interface 430. For example, a square milling cutter 452 may be used to remove excess material of the one or more first metal foils 450 by rotating the cutter 452 and translating the cutter 452 longitudinally (x-direction) along the first side 432, although other machining techniques may be used to remove the excess material.

Figure 4G:
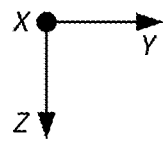
Figure 4G:
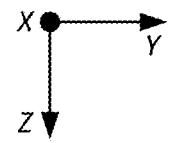
Figure 4G:
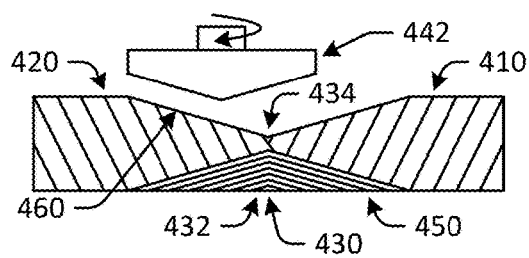

In some embodiments, a second channel 460 may be created along the second side 434 of the interface 430, as shown in FIG. 4G. As shown, the second channel 460 may have a contoured profile. The contoured profile of the second channel 460 may include a V-shaped profile, as shown, although other types of contoured profiles, such as those described above, may be used in other embodiments. In some embodiments, the second channel 460 may be machined along the second side 434. For example, the angled milling cutter 442 may be used to machine the second channel 460 by rotating the cutter 442 and translating the cutter 442 longitudinally (x-direction) along the second side 434, although other machining or metal forming techniques may be used to create the second channel 460. As shown, the maximum depth of the second channel 460 may be less than half of the thickness of the first and second metal structures 410, 420 at the interface 430. In this manner, the second channel 460 may be spaced apart from the first channel 440 and the one or more first metal foils 450. As shown, a first portion of the second channel 460 may be defined by the first metal structure 410, and a second portion of the second channel 460 may be defined by the second metal structure 420. In some embodiments, as shown, the second channel 460 may be symmetric about the interface 430.

Figure 4H:
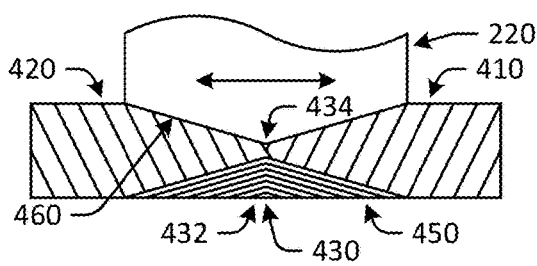

In some embodiments, the second channel 460 may be textured via the sonotrode 220, as shown in FIG. 4H. For example, the sonotrode 220 may be rolled longitudinally (x-direction) along the second channel 460 while the sonotrode 220 applies pressure vertically (z-direction) to the respective portions of the first and second metal structures 410, 420 and is vibrated laterally (y-direction) by the transducers 230. In some embodiments, the contoured profile of the second channel 460 may be the same as the contoured profile of the welding surface 222 of the sonotrode 220. In some embodiments, the contoured profile of the second channel 460 may be different from the contoured profile of the welding surface 222 of the sonotrode 220.

Figure 4I:
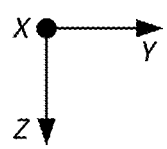
Figure 4I:
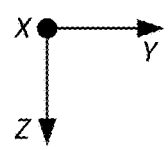
Figure 4I:
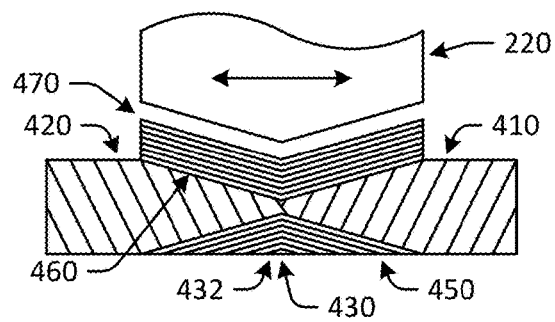

As shown in FIG. 4I, one or more second metal foils 470 may be welded at least partially within the second channel 460 via the sonotrode 220. For example, a second metal foil 470 may be positioned over the second channel 460, for example, via a tape feeder, and the sonotrode 220 may be used to weld the second metal foil 470 at least partially within the second channel 460. The sonotrode 220 may be rolled longitudinally (x-direction) over the second metal foil 470 and along the second channel 460 while the sonotrode 220 applies pressure vertically (z-direction) to the second metal foil 470 and is vibrated laterally (y-direction) by the transducers 230 to provide a scrubbing action and plastic deformation between the second metal foil 470 and the respective portions of the first and second metal structures 410, 420, resulting in solid-state welding. In some embodiments, as shown, the one or more second metal foils 470 may fill the second channel 460. In some embodiments, a single second metal foil 470 may be welded at least partially within the second channel 460. In some embodiments, a plurality of the second metal foils 470 may be welded at least partially within the second channel 460. Although seven of the second metal foils 470 are depicted in FIG. 4I, any number of the second metal foils 470 may be used.

Figure 4J:
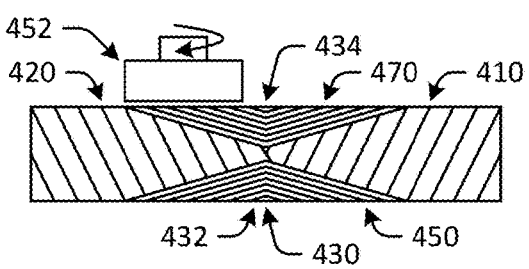

In some embodiments, excess material of the one or more second metal foils 470, such as the material positioned outside of the second channel 460, may be removed, as shown in FIG. 4J. In some embodiments, as shown, the excess material may be removed such that the remaining material of the one or more second metal foils 470 is flush with the respective surfaces of the first and second metal structures 410, 420 along the interface 430. For example, the square milling cutter 452 may be used to remove excess material of the one or more second metal foils 470, although other machining techniques may be used.

Figure 5A:
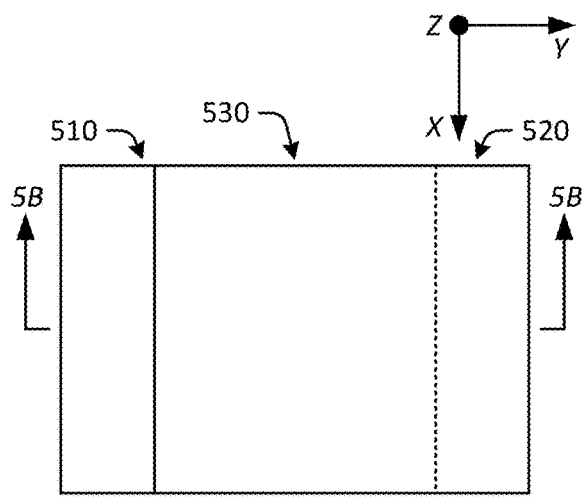
FIGS. 5A-5J illustrate a method for joining a first metal structure and a second metal structure using ultrasonic additive manufacturing in accordance with one or more embodiments of the disclosure.
Figure 5B:
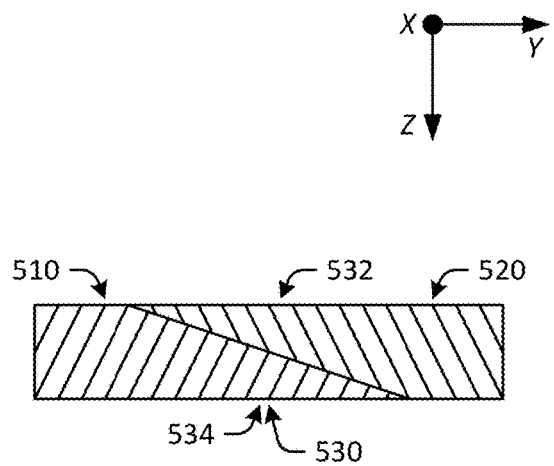

FIGS. 5A-5J depict an example method for joining a first metal structure 510 and a second metal structure 520 using ultrasonic additive manufacturing in accordance with one or more embodiments of the disclosure. It will be appreciated that the method of FIGS. 5A-5J is generally similar to the method of FIGS. 3A-3J. Certain differences relate to the type of joint used between the first and second metal structures 510, 520, how the first and second channels are formed at the interface between the first and second metal structures 510, 520, and the number of metal foils welded within the first and second channels. As shown in FIGS. 5A and 5B, the first metal structure 510 and the second metal structure 520 may be positioned adjacent one another such that the first and second metal structures 510, 520 contact one another at an interface 530. In some embodiments, as shown, the first and second metal structures 510, 520 may contact one another at a scarf joint formed by mating angled surfaces along the edges of the first and second metal structures 510, 520, although other types of joints may be used.

Figure 5C:

With the first and second metal structures 510, 520 positioned adjacent one another and fixed, a first channel 540 may be created along a first side 532 of the interface 530, as shown in FIG. 5C. As shown, the first channel 540 may have a contoured profile. For example, the contoured profile of the first channel 540 may include a V-shaped profile, as shown, although other types of contoured profiles, such as those described above, may be used in other embodiments. In some embodiments, the first channel 540 may be machined along the first side 532. For example, an angled milling cutter 542 may be used to machine the first channel 540 by rotating the cutter 542 and translating the cutter 542 longitudinally (x-direction) along the first side 532, although other machining or metal forming techniques may be used to create the first channel 540. In some embodiments, as shown, the first channel 540 may be created by removing material from only the second metal structure 520, while the mating angled surface of the first metal structure 510 remains in its original form. As shown, the maximum depth of the first channel 540 may be less than the thickness of the first and second metal structures 510, 520 at the interface 530. In this manner, the first channel 540 may be spaced apart from a second side 534 of the interface 530. As shown, a first portion of the first channel 540 may be defined by the first metal structure 510, and a second portion of the first channel 540 may be defined by the second metal structure 520. In some embodiments, as shown, the first channel 540 may be symmetric about the interface 530.

Figure 5D:

In some embodiments, the first channel 540 may be textured via the sonotrode 220, as shown in FIG. 5D. For example, the sonotrode 220 may be rolled longitudinally (x-direction) along the first channel 540 while the sonotrode 220 applies pressure vertically (z-direction) to the respective portions of the first and second metal structures 510, 520 and is vibrated laterally (y-direction) by the transducers 230. In some embodiments, the contoured profile of the first channel 540 may be the same as the contoured profile of the welding surface 222 of the sonotrode 220. In some embodiments, the contoured profile of the first channel 540 may be different from the contoured profile of the welding surface 222 of the sonotrode 220.

Figure 5E:
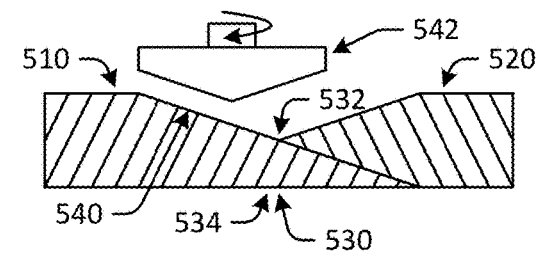

As shown in FIG. 5E, one or more first metal foils 550 may be welded at least partially within the first channel 540 via the sonotrode 220. For example, a first metal foil 550 may be positioned over the first channel 540, for example, via a tape feeder, and the sonotrode 220 may be used to weld the first metal foil 550 at least partially within the first channel 540. The sonotrode 220 may be rolled longitudinally (x-direction) over the first metal foil 550 and along the first channel 540 while the sonotrode 220 applies pressure vertically (z-direction) to the first metal foil 550 and is vibrated laterally (y-direction) by the transducers 230 to provide a scrubbing action and plastic deformation between the first metal foil 550 and the respective portions of the first and second metal structures 510, 520, resulting in solid-state welding. In some embodiments, as shown, the one or more first metal foils 550 may fill the first channel 540. In some embodiments, a single first metal foil 550 may be welded at least partially within the first channel 540. In some embodiments, a plurality of the first metal foils 550 may be welded at least partially within the first channel 540. Although eight of the first metal foils 550 are depicted in FIG. 5E, any number of the first metal foils 550 may be used.

Figure 5F:
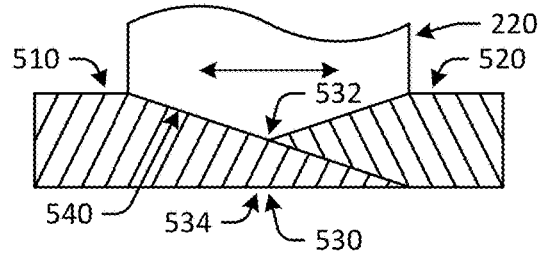

In some embodiments, excess material of the one or more first metal foils 550, such as the material positioned outside of the first channel 540, may be removed, as shown in FIG. 5F. In some embodiments, as shown, the excess material may be removed such that the remaining material of the one or more first metal foils 550 is flush with the respective surfaces of the first and second metal structures 510, 520 along the interface 530. For example, a square milling cutter 552 may be used to remove excess material of the one or more first metal foils 550 by rotating the cutter 552 and translating the cutter 552 longitudinally (x-direction) along the first side 532, although other machining techniques may be used to remove the excess material.

Figure 5G:
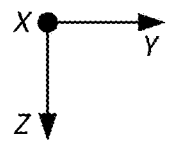
Figure 5G:
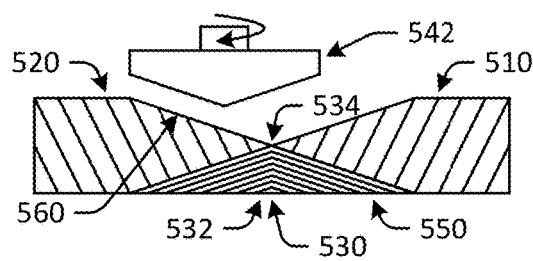

In some embodiments, a second channel 560 may be created along the second side 534 of the interface 530, as shown in FIG. 5G. As shown, the second channel 560 may have a contoured profile. The contoured profile of the second channel 560 may include a V-shaped profile, as shown, although other types of contoured profiles, such as those described above, may be used in other embodiments. In some embodiments, the second channel 560 may be machined along the second side 534. For example, the angled milling cutter 542 may be used to machine the second channel 560 by rotating the cutter 542 and translating the cutter 542 longitudinally (x-direction) along the second side 534, although other machining or metal forming techniques may be used to create the second channel 560. In some embodiments, as shown, the second channel 560 may be created by removing material from only the first metal structure 510, while a portion of the mating angled surface of the second metal structure 520 remains in its original form. As shown, the maximum depth of the second channel 560 may be less than the thickness of the first and second metal structures 510, 520 at the interface 530. In this manner, the second channel 560 may be spaced apart from the first side 532 of the interface 530. As shown, a first portion of the second channel 560 may be defined by the first metal structure 510, and a second portion of the second channel 560 may be defined by the second metal structure 520. In some embodiments, a third portion of the second channel 560 may be defined by the one or more first metal foils 550. In this manner, a portion of the one or more first metal foils 550 may be removed during creation of the second channel 560. In some embodiments, as shown, the second channel 560 may be symmetric about the interface 530.

Figure 5H:
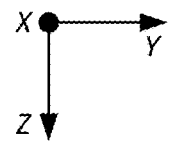
Figure 5H:
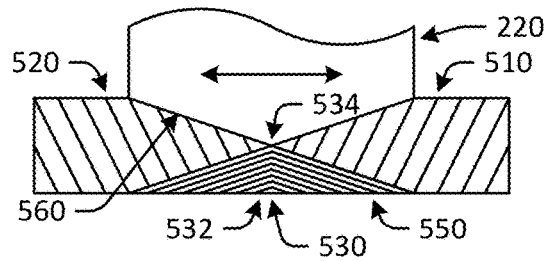

In some embodiments, the second channel 560 may be textured via the sonotrode 220, as shown in FIG. 5H. For example, the sonotrode 220 may be rolled longitudinally (x-direction) along the second channel 560 while the sonotrode 220 applies pressure vertically (z-direction) to the respective portions of the first and second metal structures 510, 520 and is vibrated laterally (y-direction) by the transducers 230. In some embodiments, the contoured profile of the second channel 560 may be the same as the contoured profile of the welding surface 222 of the sonotrode 220. In some embodiments, the contoured profile of the second channel 560 may be different from the contoured profile of the welding surface 222 of the sonotrode 220.

Figure 5I:
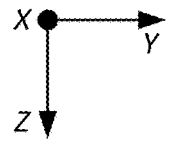
Figure 5I:
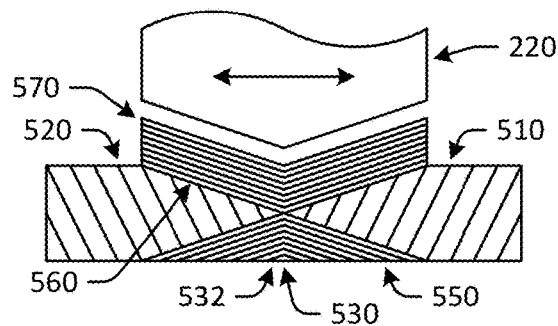

As shown in FIG. 5I, one or more second metal foils 570 may be welded at least partially within the second channel 560 via the sonotrode 220. For example, a second metal foil 570 may be positioned over the second channel 560, for example, via a tape feeder, and the sonotrode 220 may be used to weld the second metal foil 570 at least partially within the second channel 560. The sonotrode 220 may be rolled longitudinally (x-direction) over the second metal foil 570 and along the second channel 560 while the sonotrode 220 applies pressure vertically (z-direction) to the second metal foil 570 and is vibrated laterally (y-direction) by the transducers 230 to provide a scrubbing action and plastic deformation between the second metal foil 570 and the respective portions of the first and second metal structures 510, 520 and the one or more first metal foils 550, resulting in solid-state welding. In some embodiments, as shown, the one or more second metal foils 570 may fill the second channel 560. In some embodiments, a single second metal foil 570 may be welded at least partially within the second channel 560. In some embodiments, a plurality of the second metal foils 570 may be welded at least partially within the second channel 560. Although eight of the second metal foils 570 are depicted in FIG. 5I, any number of the second metal foils 570 may be used.

Figure 5J:
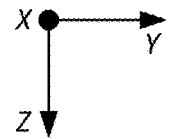
Figure 5J:
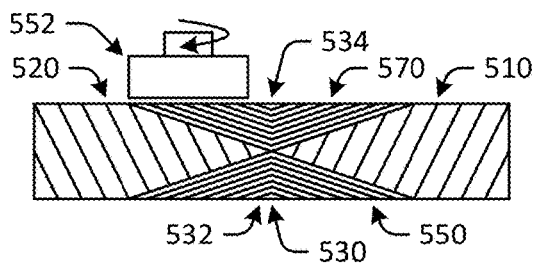

In some embodiments, excess material of the one or more second metal foils 570, such as the material positioned outside of the second channel 560, may be removed, as shown in FIG. 5J. In some embodiments, as shown, the excess material may be removed such that the remaining material of the one or more second metal foils 570 is flush with the respective surfaces of the first and second metal structures 510, 520 along the interface 530. For example, the square milling cutter 552 may be used to remove excess material of the one or more second metal foils 570, although other machining techniques may be used.

Figure 6A:
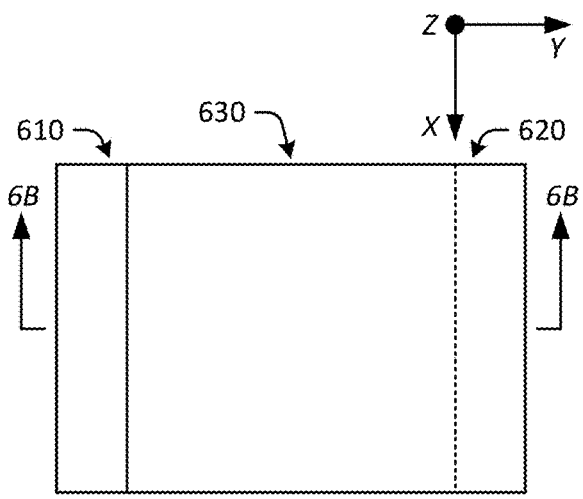
FIGS. 6A-6J illustrate a method for joining a first metal structure and a second metal structure using ultrasonic additive manufacturing in accordance with one or more embodiments of the disclosure.
Figure 6B:
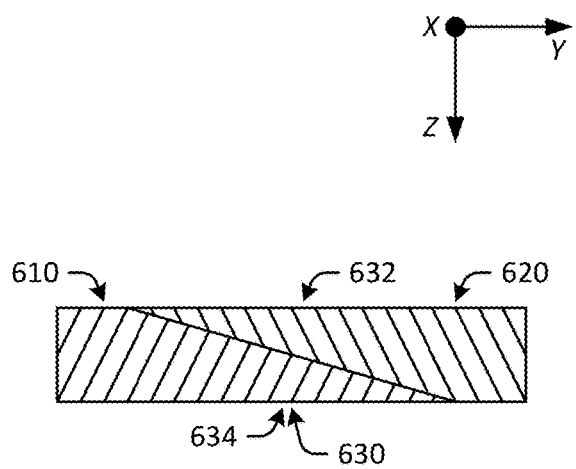

FIGS. 6A-6J depict an example method for joining a first metal structure 610 and a second metal structure 620 using ultrasonic additive manufacturing in accordance with one or more embodiments of the disclosure. It will be appreciated that the method of FIGS. 6A-6J is generally similar to the method of FIGS. 3A-3J. Certain differences relate to the type of joint used between the first and second metal structures 610, 620, how the first and second channels are formed at the interface between the first and second metal structures 610, 620, the relative depths of first and second channels, and the number of metal foils welded within the first and second channels. As shown in FIGS. 6A and 6B, the first metal structure 610 and the second metal structure 620 may be positioned adjacent one another such that the first and second metal structures 610, 620 contact one another at an interface 630. In some embodiments, as shown, the first and second metal structures 610, 620 may contact one another at a scarf joint formed by mating angled surfaces along the edges of the first and second metal structures 610, 620, although other types of joints may be used.

Figure 6C:
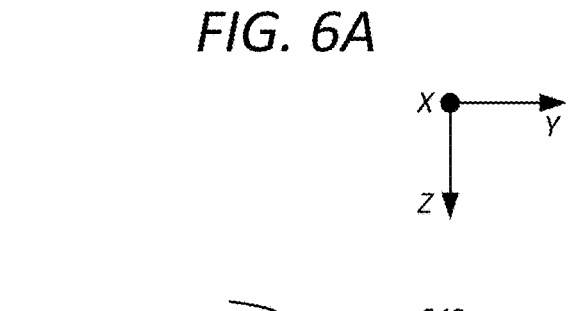

With the first and second metal structures 610, 620 positioned adjacent one another and fixed, a first channel 640 may be created along a first side 632 of the interface 630, as shown in FIG. 6C. As shown, the first channel 640 may have a contoured profile. For example, the contoured profile of the first channel 640 may include a V-shaped profile, as shown, although other types of contoured profiles, such as those described above, may be used in other embodiments. In some embodiments, the first channel 640 may be machined along the first side 632. For example, an angled milling cutter 642 may be used to machine the first channel 640 by rotating the cutter 642 and translating the cutter 642 longitudinally (x-direction) along the first side 632, although other machining or metal forming techniques may be used to create the first channel 640. In some embodiments, as shown, the first channel 640 may be created by removing material from only the second metal structure 620. As shown, the maximum depth of the first channel 640 may be less than half of the thickness of the first and second metal structures 610, 620 at the interface 630. In this manner, the first channel 640 may be spaced apart from a second side 634 of the interface 630. In some embodiments, as shown, the first channel 640 may be defined entirely by the second metal structure 620. In some embodiments, as shown, the first channel 640 may be symmetric about the interface 630.

Figure 6D:
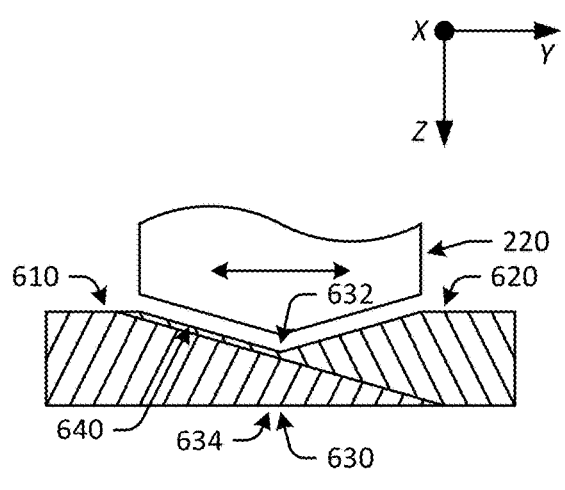

In some embodiments, the first channel 640 may be textured via the sonotrode 220 and a portion of the second metal structure 620 may be welded to an adjacent portion of the first metal structure 610, as shown in FIG. 6D. For example, the sonotrode 220 may be rolled longitudinally (x-direction) along the first channel 640 while the sonotrode 220 applies pressure vertically (z-direction) to the respective portions of the second metal structure 520 and is vibrated laterally (y-direction) by the transducers 230. As shown, the thin portion of the second metal structure 620 may be welded to the adjacent portion of the first metal structure 610. In some embodiments, the contoured profile of the first channel 640 may be the same as the contoured profile of the welding surface 222 of the sonotrode 220. In some embodiments, the contoured profile of the first channel 640 may be different from the contoured profile of the welding surface 222 of the sonotrode 220.

Figure 6E:
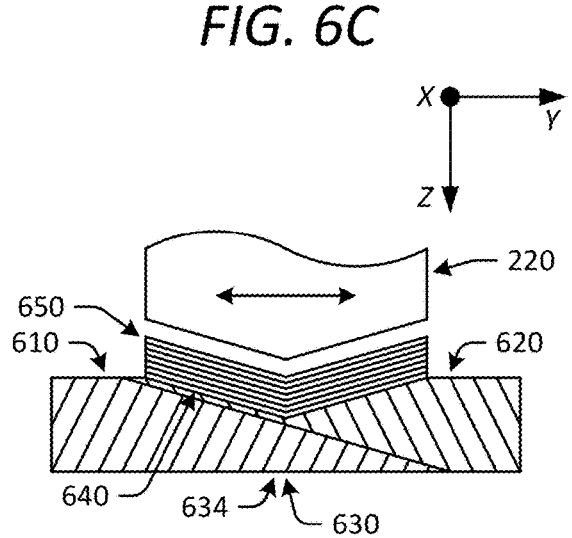

As shown in FIG. 6E, one or more first metal foils 650 may be welded at least partially within the first channel 640 via the sonotrode 220. For example, a first metal foil 650 may be positioned over the first channel 640, for example, via a tape feeder, and the sonotrode 220 may be used to weld the first metal foil 650 at least partially within the first channel 640. The sonotrode 220 may be rolled longitudinally (x-direction) over the first metal foil 650 and along the first channel 640 while the sonotrode 220 applies pressure vertically (z-direction) to the first metal foil 650 and is vibrated laterally (y-direction) by the transducers 230 to provide a scrubbing action and plastic deformation between the first metal foil 650 and the respective portions of the second metal structure 620, resulting in solid-state welding. In some embodiments, as shown, the one or more first metal foils 650 may fill the first channel 640. In some embodiments, a single first metal foil 650 may be welded at least partially within the first channel 640. In some embodiments, a plurality of the first metal foils 650 may be welded at least partially within the first channel 640. Although seven of the first metal foils 650 are depicted in FIG. 6E, any number of the first metal foils 650 may be used.

Figure 6F:
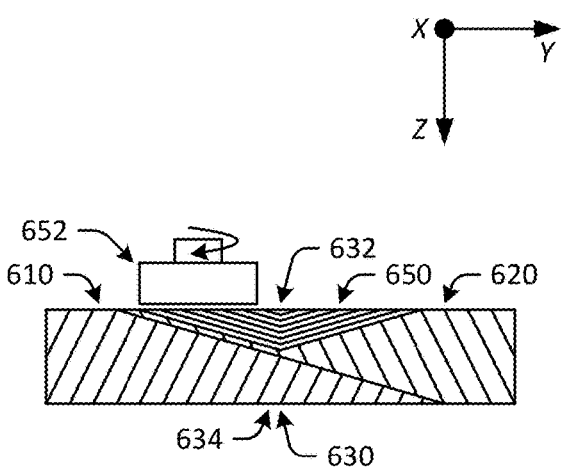

In some embodiments, excess material of the one or more first metal foils 650, such as the material positioned outside of the first channel 640, may be removed, as shown in FIG. 6F. In some embodiments, as shown, the excess material may be removed such that the remaining material of the one or more first metal foils 650 is flush with the respective surfaces of the first and second metal structures 610, 620 along the interface 630. For example, a square milling cutter 652 may be used to remove excess material of the one or more first metal foils 650 by rotating the cutter 652 and translating the cutter 652 longitudinally (x-direction) along the first side 632, although other machining techniques may be used to remove the excess material.

Figure 6G:
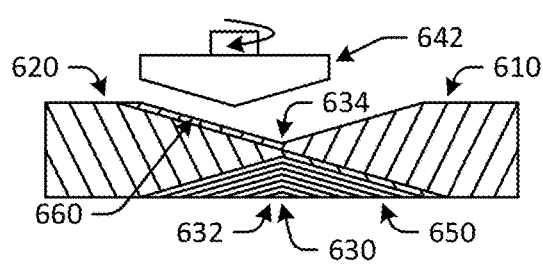

In some embodiments, a second channel 660 may be created along the second side 634 of the interface 530, as shown in FIG. 6G. As shown, the second channel 660 may have a contoured profile. The contoured profile of the second channel 660 may include a V-shaped profile, as shown, although other types of contoured profiles, such as those described above, may be used in other embodiments. In some embodiments, the second channel 660 may be machined along the second side 634. For example, the angled milling cutter 642 may be used to machine the second channel 660 by rotating the cutter 642 and translating the cutter 642 longitudinally (x-direction) along the second side 634, although other machining or metal forming techniques may be used to create the second channel 660. In some embodiments, as shown, the second channel 660 may be created by removing material from only the first metal structure 610. As shown, the maximum depth of the second channel 660 may be less than half of the thickness of the first and second metal structures 610, 620 at the interface 630. In this manner, the second channel 660 may be spaced apart from the first side 632 of the interface 630. In some embodiments, as shown, the second channel 660 may be defined entirely by the first metal structure 610. In some embodiments, as shown, the second channel 660 may be symmetric about the interface 630.

Figure 6H:
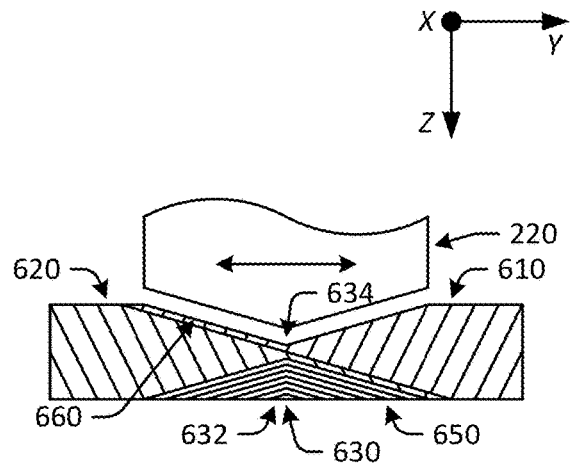

In some embodiments, the second channel 660 may be textured via the sonotrode 220 and a portion of the first metal structure 610 may be welded to an adjacent portion of the second metal structure 620, as shown in FIG. 6H. For example, the sonotrode 220 may be rolled longitudinally (x-direction) along the second channel 660 while the sonotrode 220 applies pressure vertically (z-direction) to the respective portions of the first metal structure 610 and is vibrated laterally (y-direction) by the transducers 230. As shown, the thin portion of the first metal structure 610 may be welded to the adjacent portion of the second metal structure 620. In some embodiments, the contoured profile of the second channel 660 may be the same as the contoured profile of the welding surface 222 of the sonotrode 220. In some embodiments, the contoured profile of the second channel 660 may be different from the contoured profile of the welding surface 222 of the sonotrode 220.

Figure 6I:
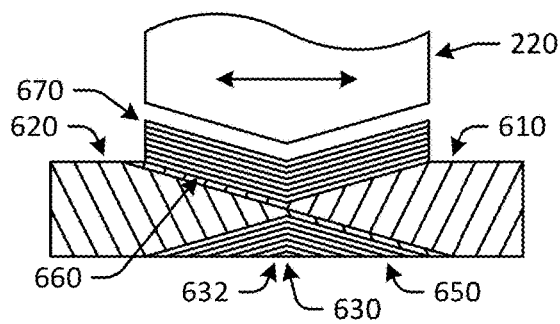

As shown in FIG. 6I, one or more second metal foils 670 may be welded at least partially within the second channel 660 via the sonotrode 220. For example, a second metal foil 670 may be positioned over the second channel 660, for example, via a tape feeder, and the sonotrode 220 may be used to weld the second metal foil 670 at least partially within the second channel 660. The sonotrode 220 may be rolled longitudinally (x-direction) over the second metal foil 670 and along the second channel 660 while the sonotrode 220 applies pressure vertically (z-direction) to the second metal foil 670 and is vibrated laterally (y-direction) by the transducers 230 to provide a scrubbing action and plastic deformation between the second metal foil 670 and the respective portions of the first metal structure 610, resulting in solid-state welding. In some embodiments, as shown, the one or more second metal foils 570 may fill the second channel 560. In some embodiments, a single second metal foil 670 may be welded at least partially within the second channel 660. In some embodiments, a plurality of the second metal foils 670 may be welded at least partially within the second channel 560. Although seven of the second metal foils 670 are depicted in FIG. 6I, any number of the second metal foils 670 may be used.

Figure 6J:
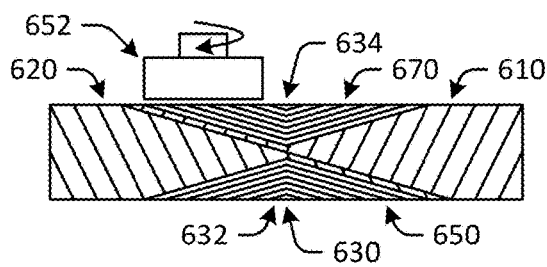

In some embodiments, excess material of the one or more second metal foils 670, such as the material positioned outside of the second channel 660, may be removed, as shown in FIG. 6J. In some embodiments, as shown, the excess material may be removed such that the remaining material of the one or more second metal foils 670 is flush with the respective surfaces of the first and second metal structures 610, 620 along the interface 630. For example, the square milling cutter 652 may be used to remove excess material of the one or more second metal foils 670, although other machining techniques may be used.

Figure 7A:
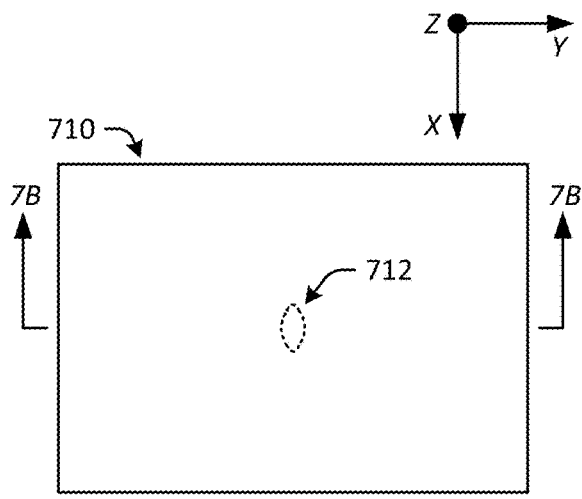
FIGS. 7A-7F illustrate a method for repairing a defect in a metal structure using ultrasonic additive manufacturing in accordance with one or more embodiments of the disclosure.
Figure 7B:
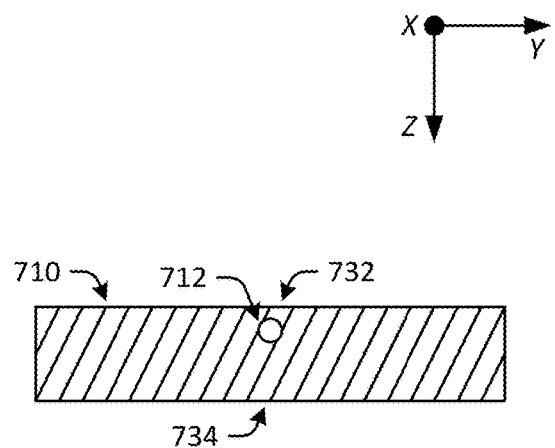

FIGS. 7A-7F depict an example method for repairing a defect in a metal structure 710 using ultrasonic additive manufacturing in accordance with one or more embodiments of the disclosure. As shown in FIGS. 7A and 7B, the metal structure 710 may have a defect 712. In some embodiments, the defect 712 may be a manufacturing defect, such as a void or imperfection in the metal structure 710 as originally manufactured. In some embodiments, the defect 712 may be a result of wear or corrosion of the metal structure 710 over time or damage caused to the metal structure 710 during use thereof. For example, the defect 712 may be a crack or a dent in the metal structure 710. In some embodiments, as shown, the metal structure 710 may be formed as a plate or sheet having a generally planar shape, although other shapes, such as curved or otherwise contoured shapes, of the metal structure 710 may be used in other embodiments. In some embodiments, the defect 712 may be an internal defect positioned within the metal structure 710. In some embodiments, the defect 712 may be a surface defect positioned along an outer surface of the metal structure 710.

Figure 7C:

With the metal structure 710 fixed, a channel 740 may be created along a first side 732 of the metal structure 710 such that the defect 712 is removed from the metal structure 710, as shown in FIG. 7C. As shown, the channel 740 may have a contoured profile. For example, the contoured profile of the channel 740 may include a V-shaped profile, as shown, although other types of contoured profiles, such as those described above, may be used in other embodiments. In some embodiments, the channel 740 may be machined along the first side 732. For example, an angled milling cutter 742 may be used to machine the channel 740 by rotating the cutter 742 and translating the cutter 742 longitudinally (x-direction) along the first side 732. One or more passes of the angled milling cutter 742 may be used to create the channel 740. In other embodiments, alternative machining or metal forming techniques may be used to create the channel 740. As shown, the maximum depth of the channel 740 may be less than the thickness of the metal structure 710. In this manner, the channel 740 may be spaced apart from a second side 734 of the metal structure 710.

Figure 7D:

In some embodiments, the channel 740 may be textured via the sonotrode 220, as shown in FIG. 7D. For example, the sonotrode 220 may be rolled longitudinally (x-direction) along the channel 740 while the sonotrode 220 applies pressure vertically (z-direction) to the metal structure 710 and is vibrated laterally (y-direction) by the transducers 230. In this manner, the surfaces of the channel 740 may be textured by the surface texture of the sonotrode 220. In some embodiments, the contoured profile of the channel 740 may be the same as the contoured profile of the welding surface 222 of the sonotrode 220. In some embodiments, the contoured profile of the channel 740 may be different from the contoured profile of the welding surface 222 of the sonotrode 220.

Figure 7E:
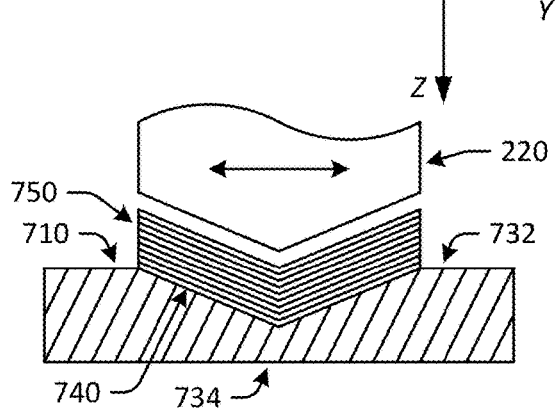

As shown in FIG. 7E, one or more metal foils 750 may be welded at least partially within the channel 740 via the sonotrode 220. For example, a metal foil 750 may be positioned over the channel 740, for example, via a tape feeder, and the sonotrode 220 may be used to weld the metal foil 750 at least partially within the channel 740. The sonotrode 220 may be rolled longitudinally (x-direction) over the metal foil 750 and along the channel 740 while the sonotrode 220 applies pressure vertically (z-direction) to the metal foil 750 and is vibrated laterally (y-direction) by the transducers 230 to provide a scrubbing action and plastic deformation between the metal foil 750 and the metal structure 710, resulting in solid-state welding.

In some embodiments, as shown, the one or more metal foils 750 may fill the channel 740. In some embodiments, a single metal foil 750 may be welded at least partially within the channel 740. In some embodiments, a plurality of the metal foils 750 may be welded at least partially within the channel 740. Although nine of the metal foils 750 are depicted in FIG. 7E, any number of the metal foils 750 may be used. In some embodiments, a plurality of the metal foils 750 may be separately welded at least partially within the channel 740. In other words, the metal foils 750 may be welded one at a time. In some embodiments, a plurality of the metal foils 750 may be simultaneously welded at least partially within the channel 740. In other words, two or more or the metal foils 750 may be welded at the same time. In some embodiments, material may be removed from one or more of the welded metal foils 750, such as by machining, prior to welding one or more additional metal foils 750. For example, material may be removed from one or more metal foils 750 after welding the one or more metal foils 750 at least partially within the channel 740, and then one or more additional metal foils 750 may be welded at least partially within the channel 740.

In some embodiments, the metal structure 710 and the one or more metal foils 750 may be formed of the same metal or alloy. In some embodiments, the metal structure 710 may be formed of a first metal or alloy, and the one or more metal foils 750 may be formed of a second metal or alloy different from the first metal or alloy. In some embodiments, the one or more metal foils 750 may include a plurality of the metal foils 750 formed of the same metal or alloy. In some embodiments, the one or more metal foils 750 may include a plurality of the metal foils 750 formed of different metals or alloys.

Figure 7F:
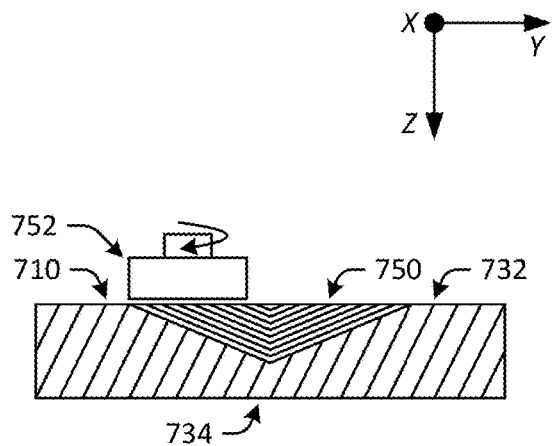

In some embodiments, excess material of the one or more metal foils 750 may be removed, as shown in FIG. 7F. For example, material of the one or more metal foils 750 positioned outside of the channel 740 may be removed. In some embodiments, as shown, excess material of the one or more metal foils 750 may be removed such that the remaining material of the one or more metal foils 750 is flush with the respective surface of the metal structure 710. For example, a square milling cutter 752 may be used to remove excess material of the one or more metal foils 750 by rotating the cutter 752 and translating the cutter 752 longitudinally (x-direction) along the first side 732. One or more passes of the square milling cutter 752 may be used to remove the excess material. In other embodiments, alternative machining techniques may be used to remove the excess material.

In some applications, two or more different sonotrodes including respective welding surfaces having different profiles may be used when joining metal structures using ultrasonic additive manufacturing or when repairing a defect in a metal structure using ultrasonic additive manufacturing. For example, a first sonotrode with a welding surface having a first profile may be used for welding one or more first metal foils, and a second sonotrode with a welding surface having a second profile different from the first profile may be used for welding one or more second metal foils. In some embodiments, the first profile may be a first contoured profile, and the second profile may be a second contoured profile that is different in shape than the first contoured profile. For example, one of the first contoured profile and the second contoured profile may be a V-shaped profile, and the other of the first contoured profile and the second contoured profile may be a curved profile. As another example, the first contoured profile may be a V-shaped profile having a first included angle, and the second contoured profile may be a V-shaped profile having a second included angle that is different from the first included angle. Alternatively, the first contoured profile may be a curved profile having a first constant radius of curvature, and the second contoured profile may be a curved profile having a second constant radius of curvature that is different from the first constant radius of curvature. In yet another example, the first contoured profile may be a curved profile having a constant radius of curvature, and the second contoured profile may be a curved profile having a variable radius of curvature that is different from the first constant radius of curvature. In some embodiments, one of the first profile and the second profile may be a contoured profile, and the other of the first profile and the second profile may be a flat profile (i.e., one of the sonotrodes may have a conventional cylindrical shape with a flat profile). Various combinations of two or more different sonotrodes including respective welding surfaces having different profiles may be used in different applications for welding metal foils in joining or repair operations.

In some embodiments, the one or more first metal foils welded using the first sonotrode may be formed of a first metal or alloy, and the one or more second metal foils welded using the second sonotrode may be formed of a second metal or alloy that is different from the first metal or alloy. In some embodiments, the one or more second metal foils may be welded over the one or more first metal foils, such that the one or more second metal foils completely, or at least partially, cover the one or more first metal foils. In this manner, the one or more second metal foils may be applied as a cladding layer over the one or more first metal foils. For example, the one or more second metal foils may be formed of high purity aluminum to provide a structure similar to ALCLAD, although various other metals or alloys may be used for cladding purposes in other embodiments.

FIGS. 8A-8D, when viewed in conjunction with FIGS. 3A-3J, depict an example method of using two different sonotrodes including respective welding surfaces having different profiles for joining metal structures using ultrasonic additive manufacturing in accordance with one or more embodiments of the disclosure. As described above with respect to FIGS. 3A-3J, the one or more first metal foils 350 may be welded, via a first sonotrode 220, within the first channel 340 created along the first side 332 of the interface 330 between the first and second metal structures 310, 320, and the one or more second metal foils 370 may be welded, via the first sonotrode 220, within the second channel 360 created along the second side 334 of the interface 330. FIGS. 8A-8D depict additional steps that may be performed for welding one or more additional metal foils within an additional channel formed in the resulting assembly shown in FIG. 3J. According to the illustrated embodiment, the one or more additional metal foils may be applied as a cladding layer over the one or more first metal foils 350, although other configurations of the one or more additional metal foils may be used in other embodiments.

Figure 8A:
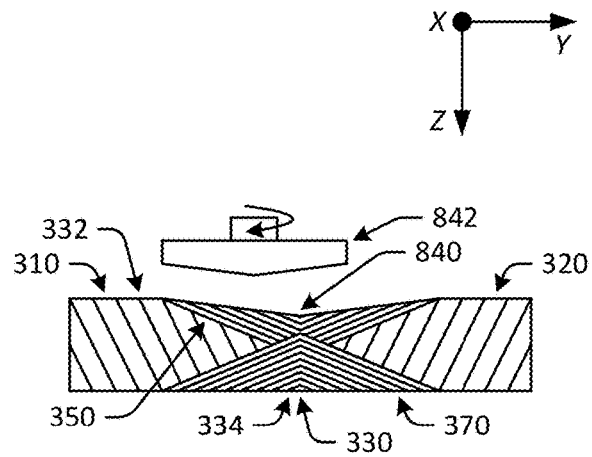
FIGS. 8A-8D, when viewed in conjunction with FIGS. 3A-3J, illustrate a method of using two different sonotrodes including respective welding surfaces having different profiles for joining a first metal structure and a second metal structure using ultrasonic additive manufacturing in accordance with one or more embodiments of the disclosure.

In some embodiments, a third channel 840 may be created along the first side 332 of the interface 330 such that a portion of the one or more first metal foils 350 is removed, as shown in FIG. 8A. In some embodiments, as shown, the third channel 840 may have a contoured profile. For example, the contoured profile of the third channel 840 may include a V-shaped profile, as shown, although other types of contoured profiles, such as those described above, may be used in other embodiments. As shown, the contoured profile of the third channel 840 may be different from the contoured profile of the first channel 340. For example, as shown, the included angle of the contoured profile of the third channel 840 may be greater than the included angle of the contoured profile of the first channel 340. In other embodiments, the third channel 840 may have a flat profile. In some embodiments, the third channel 840 may be machined along the first side 332. For example, an angled milling cutter 842 may be used to machine the third channel 840 by rotating the cutter 842 and translating the cutter 842 longitudinally (x-direction) along the first side 332 of the interface 330. One or more passes of the angled milling cutter 842 may be used to create the third channel 840. In other embodiments, alternative machining or metal forming techniques may be used to create the third channel 840. As shown, the maximum depth of the third channel 840 may be less than the maximum depth of the first channel 340. As shown, the third channel 840 may be defined by respective portions of the one or more first metal foils 350. In some embodiments, as shown, the third channel 840 may be symmetric about the interface 330.

Figure 8B:
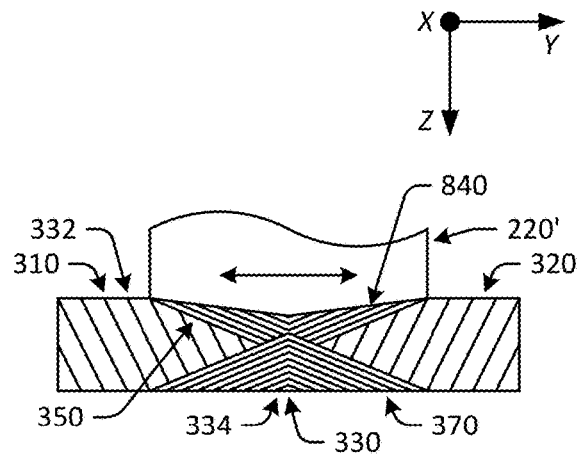

In some embodiments, the third channel 840 may be textured via a second sonotrode 220', as shown in FIG. 8B. For example, the second sonotrode 220' may be rolled longitudinally (x-direction) along the third channel 840 while the second sonotrode 220' applies pressure vertically (z-direction) to the respective portions of the first metal foils 350 and is vibrated laterally (y-direction) by the transducers 230. In this manner, the surfaces of the third channel 840 may be textured by the surface texture of the second sonotrode 220'. In some embodiments, the contoured profile of the third channel 840 may be the same as the contoured profile of the welding surface 222 of the second sonotrode 220'. In some embodiments, the contoured profile of the third channel 840 may be different from the contoured profile of the welding surface 222 of the second sonotrode 220'. As shown, the contoured profile of the welding surface 222 of the second sonotrode 220' may be different from the contoured profile of the welding surface 222 of the first sonotrode 220. For example, as shown, the contoured profile of the welding surface 222 of the second sonotrode 220' may be a V-shaped profile having an included angle that is greater than the included angle of the V-shaped contoured profile of the welding surface 222 of the first sonotrode 220. As discussed above, other differences between the contoured profiles of the respective welding surfaces 222 of the second sonotrode 220' and the first sonotrode 220 may be used in other embodiments. Further, in some embodiments, the second sonotrode may be a conventional sonotrode having a cylindrical welding surface with a flat profile.

Figure 8C:
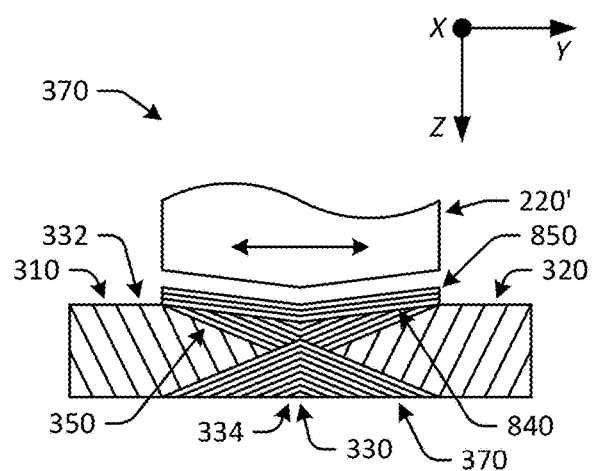

As shown in FIG. 8C, one or more third metal foils 850 may be welded at least partially within the third channel 840 via the second sonotrode 220'. For example, a third metal foil 850 may be positioned over the third channel 840, for example, via a tape feeder, and the second sonotrode 220' may be used to weld the third metal foil 850 at least partially within the third channel 840. The second sonotrode 220' may be rolled longitudinally (x-direction) over the third metal foil 850 and along the third channel 840 while the second sonotrode 220' applies pressure vertically (z-direction) to the third metal foil 850 and is vibrated laterally (y-direction) by the transducers 230 to provide a scrubbing action and plastic deformation between the third metal foil 850 and the respective portions of the one or more first metal foils 350, resulting in solid-state welding.

In some embodiments, as shown, the one or more third metal foils 850 may fill the third channel 840. In some embodiments, a single third metal foil 850 may be welded at least partially within the third channel 840. In some embodiments, a plurality of the third metal foils 850 may be welded at least partially within the third channel 840. Although three of the third metal foils 850 are depicted in FIG. 8C, any number of the third metal foils 850 may be used. In some embodiments, a plurality of the third metal foils 850 may be separately welded at least partially within the third channel 840. In other words, the third metal foils 850 may be welded one at a time. In some embodiments, a plurality of the third metal foils 850 may be simultaneously welded at least partially within the third channel 840. In other words, two or more or the third metal foils 850 may be welded at the same time. In some embodiments, material may be removed from one or more of the welded third metal foils 850, such as by machining, prior to welding one or more additional third metal foils 850. For example, material may be removed from one or more third metal foils 850 after welding the one or more third metal foils 850 at least partially within the third channel 840, and then one or more additional third metal foils 850 may be welded at least partially within the third channel 840.

Figure 8D:
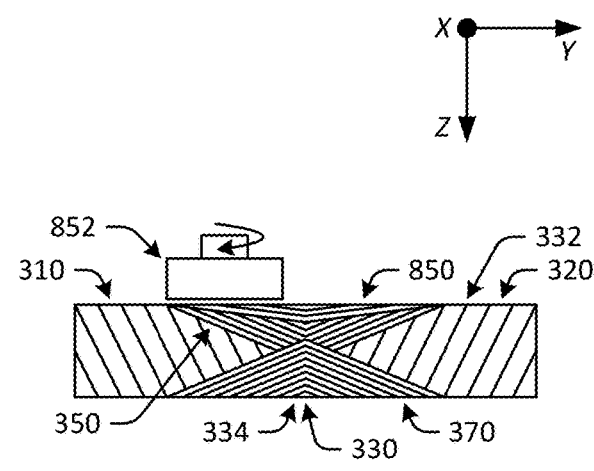

In some embodiments, excess material of the one or more third metal foils 850 may be removed, as shown in FIG. 8D. For example, material of the one or more third metal foils 850 positioned outside of the third channel 840 may be removed. In some embodiments, as shown, excess material of the one or more third metal foils 850 may be removed such that the remaining material of the one or more third metal foils 850 is flush with the respective surfaces of the first and second metal structures 310, 320 along the interface 330. For example, a square milling cutter 852 may be used to remove excess material of the one or more third metal foils 850 by rotating the cutter 852 and translating the cutter 852 longitudinally (x-direction) along the first side 332 of the interface 330. One or more passes of the square milling cutter 852 may be used to remove the excess material. In other embodiments, alternative machining techniques may be used to remove the excess material.

In some applications, it may be desirable to apply additional metal foils along the second side 334 of the interface 330 as well, for example as a cladding layer over the one or more second metal foils 370. Accordingly, in some embodiments, the assembly of the first and second metal structures 310, 320 may be removed from the base structure 210 and flipped over, and steps corresponding to those depicted in FIGS. 8A-8D and described above may be carried out with respect to the second side 334 of the interface 330.

FIGS. 9A-9D, when viewed in conjunction with FIGS. 7A-7F, depict an example method of using two different sonotrodes including respective welding surfaces having different profiles for repairing a defect in a metal structure using ultrasonic additive manufacturing in accordance with one or more embodiments of the disclosure. As described above with respect to FIGS. 7A-7F, the first channel 740 may be created along the first side 732 of the metal structure 710 such that the defect 712 is removed, and the one or more first metal foils 750 may be welded, via a first sonotrode 220, within the first channel 740. FIGS. 9A-9D depict additional steps that may be performed for welding one or more additional metal foils within an additional channel formed in the resulting assembly shown in FIG. 7F. According to the illustrated embodiment, the one or more additional metal foils may be applied as a cladding layer over the one or more first metal foils 750, although other configurations of the one or more additional metal foils may be used in other embodiments.

In some embodiments, a second channel 940 may be created along the first side 732 of the metal structure 710 such that a portion of the one or more first metal foils 750 is removed, as shown in FIG. 9A. In some embodiments, as shown, the second channel 940 may have a contoured profile. For example, the contoured profile of the second channel 940 may include a V-shaped profile, as shown, although other types of contoured profiles, such as those described above, may be used in other embodiments. As shown, the contoured profile of the second channel 940 may be different from the contoured profile of the first channel 740. For example, as shown, the included angle of the contoured profile of the second channel 940 may be greater than the included angle of the contoured profile of the first channel 740. In other embodiments, the second channel 940 may have a flat profile. In some embodiments, the second channel 940 may be machined along the first side 732. For example, an angled milling cutter 942 may be used to machine the second channel 940 by rotating the cutter 942 and translating the cutter 942 longitudinally (x-direction) along the first side 732. One or more passes of the angled milling cutter 942 may be used to create the second channel 940. In other embodiments, alternative machining or metal forming techniques may be used to create the second channel 940. As shown, the maximum depth of the second channel 940 may be less than the maximum depth of the first channel 740. As shown, the second channel 940 may be defined by respective portions of the one or more first metal foils 750.

In some embodiments, the second channel 940 may be textured via a second sonotrode 220', as shown in FIG. 9B. For example, the second sonotrode 220' may be rolled longitudinally (x-direction) along the second channel 940 while the second sonotrode 220' applies pressure vertically (z-direction) to the respective portions of the first metal foils 750 and is vibrated laterally (y-direction) by the transducers 230. In this manner, the surfaces of the second channel 940 may be textured by the surface texture of the second sonotrode 220'. In some embodiments, the contoured profile of the second channel 940 may be the same as the contoured profile of the welding surface 222 of the second sonotrode 220'. In some embodiments, the contoured profile of the second channel 940 may be different from the contoured profile of the welding surface 222 of the second sonotrode 220'. As shown, the contoured profile of the welding surface 222 of the second sonotrode 220' may be different from the contoured profile of the welding surface 222 of the first sonotrode 220. For example, as shown, the contoured profile of the welding surface 222 of the second sonotrode 220' may be a V-shaped profile having an included angle that is greater than the included angle of the V-shaped contoured profile of the welding surface 222 of the first sonotrode 220. As discussed above, other differences between the contoured profiles of the respective welding surfaces 222 of the second sonotrode 220' and the first sonotrode 220 may be used in other embodiments. Further, in some embodiments, the second sonotrode may be a conventional sonotrode having a cylindrical welding surface with a flat profile.

As shown in FIG. 9C, one or more second metal foils 950 may be welded at least partially within the second channel 940 via the second sonotrode 220'. For example, a second metal foil 950 may be positioned over the second channel 940, for example, via a tape feeder, and the second sonotrode 220' may be used to weld the second metal foil 950 at least partially within the second channel 940. The second sonotrode 220' may be rolled longitudinally (x-direction) over the second metal foil 950 and along the second channel 940 while the second sonotrode 220' applies pressure vertically (z-direction) to the second metal foil 950 and is vibrated laterally (y-direction) by the transducers 230 to provide a scrubbing action and plastic deformation between the second metal foil 950 and the respective portions of the one or more first metal foils 750, resulting in solid-state welding.

In some embodiments, as shown, the one or more second metal foils 950 may fill the second channel 940. In some embodiments, a single second metal foil 950 may be welded at least partially within the second channel 940. In some embodiments, a plurality of the second metal foils 950 may be welded at least partially within the second channel 940. Although three of the second metal foils 950 are depicted in FIG. 9C, any number of the second metal foils 950 may be used. In some embodiments, a plurality of the second metal foils 950 may be separately welded at least partially within the second channel 940. In other words, the second metal foils 950 may be welded one at a time. In some embodiments, a plurality of the second metal foils 950 may be simultaneously welded at least partially within the second channel 940. In other words, two or more or the second metal foils 950 may be welded at the same time. In some embodiments, material may be removed from one or more of the welded second metal foils 950, such as by machining, prior to welding one or more additional second metal foils 950. For example, material may be removed from one or more second metal foils 950 after welding the one or more second metal foils 950 at least partially within the second channel 940, and then one or more additional second metal foils 950 may be welded at least partially within the second channel 940.

In some embodiments, excess material of the one or more second metal foils 950 may be removed, as shown in FIG. 9D. For example, material of the one or more second metal foils 950 positioned outside of the second channel 940 may be removed. In some embodiments, as shown, excess material of the one or more second metal foils 950 may be removed such that the remaining material of the one or more second metal foils 950 is flush with the respective surface of the metal structure 710. For example, a square milling cutter 952 may be used to remove excess material of the one or more second metal foils 950 by rotating the cutter 952 and translating the cutter 952 longitudinally (x-direction) along the first side 732. One or more passes of the square milling cutter 952 may be used to remove the excess material. In other embodiments, alternative machining techniques may be used to remove the excess material.

Although specific embodiments of the disclosure have been described, one of ordinary skill in the art will recognize that numerous other modifications and alternative embodiments are within the scope of the disclosure. Further, while various illustrative implementations and architectures have been described in accordance with embodiments of the disclosure, one of ordinary skill in the art will appreciate that numerous other modifications to the illustrative implementations and architectures described herein are also within the scope of this disclosure and the claims here appended and those which may be filed in non-provisional patent application(s).

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments.

What is claimed is:

1. An ultrasonic additive manufacturing system comprising:
   a base structure;
   a sonotrode configured to rotate about an axis of rotation, wherein the sonotrode comprises a welding surface extending along a circumference of the sonotrode, wherein the welding surface has a V-shaped profile and a first side and a second side disposed opposite one another in a direction of the axis of rotation, wherein the welding surface has a central plane disposed between the first side and the second side in the direction of the axis of rotation, wherein the central plane extends perpendicular to the axis of rotation of the sonotrode and is centered with respect to the welding surface in the direction of the axis of rotation, wherein the welding surface has a maximum diameter located in the central plane, and wherein at least one of the sonotrode and the base structure is configured to translate relative to the other of the sonotrode and the base structure; and
   one or more transducers configured to vibrate the sonotrode.

2. The ultrasonic additive manufacturing system of claim 1, wherein the V-shaped profile is defined by a first side portion and a second side portion of the welding surface.

3. The ultrasonic additive manufacturing system of claim 1, wherein the V-shaped profile further comprises a curved profile defined by a central portion of the welding surface disposed between a first side portion and a second side portion of the welding surface.

4. The ultrasonic additive manufacturing system of claim 1, wherein the V-shaped profile is symmetric about the central plane.

5. The ultrasonic additive manufacturing system of claim 1, wherein the welding surface comprises a surface texture.

6. The ultrasonic additive manufacturing system of claim 1, wherein the V-shaped profile is defined by a first side portion and a second side portion of the welding surface, and wherein the V-shaped profile is formed such that the first side portion and the second side portion of the welding surface converge at a point along the central plane of the welding surface.

7. The ultrasonic additive manufacturing system of claim 1, wherein the V-shaped profile has an included angle between 60 degrees and 179 degrees.

8. The ultrasonic additive manufacturing system of claim 1, wherein the welding surface extends along an entirety of the circumference of the sonotrode.

9. The ultrasonic additive manufacturing system of claim 8, wherein a shape of the V-shaped profile is the same along the entirety of the circumference of the sonotrode.

10. The ultrasonic additive manufacturing system of claim 1, wherein a diameter of the welding surface varies along the first side and the second side in a direction of the axis of rotation.

11. The ultrasonic additive manufacturing system of claim 1, wherein the at least one of the sonotrode and the base structure is configured to translate relative to the other of the sonotrode and the base structure in a direction perpendicular to the axis of rotation of the sonotrode.

12. The ultrasonic additive manufacturing system of claim 1, wherein the one or more transducers are configured to vibrate the sonotrode in a direction of the axis of rotation of the sonotrode.

* * * * *